US012175761B2

(12) United States Patent
Nakamura et al.

(10) Patent No.: US 12,175,761 B2
(45) Date of Patent: Dec. 24, 2024

(54) INFORMATION PROCESSING APPARATUS, INFORMATION PROCESSING METHOD, AND PROGRAM

(71) Applicant: NEC Corporation, Tokyo (JP)

(72) Inventors: Motoyuki Nakamura, Tokyo (JP); Hisayoshi Mura, Tokyo (JP); Shinya Yamasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/230,079

(22) Filed: Aug. 3, 2023

(65) Prior Publication Data

US 2023/0410514 A1 Dec. 21, 2023

Related U.S. Application Data

(63) Continuation of application No. 17/435,487, filed as application No. PCT/JP2020/008661 on Mar. 2, 2020.

(30) Foreign Application Priority Data

Mar. 4, 2019 (JP) ................................ 2019-039015

(51) Int. Cl.
*G06V 20/52* (2022.01)
*G06Q 20/20* (2012.01)
(Continued)

(52) U.S. Cl.
CPC ........... *G06V 20/52* (2022.01); *G06Q 20/203* (2013.01); *G06T 7/292* (2017.01); *G06T 7/70* (2017.01);
(Continued)

(58) Field of Classification Search
CPC ........ G06V 10/22; G06V 20/52; G06V 20/60; G06V 40/103; G06Q 10/04; G06Q 20/047;
(Continued)

(56) References Cited

U.S. PATENT DOCUMENTS 11,354,683 B1* 6/2022 Shin .................... G06Q 30/0201
2012/0169882 A1* 7/2012 Millar .............. G08B 13/19608
348/E7.086

(Continued)

FOREIGN PATENT DOCUMENTS

CN 107240124 A 10/2017
JP 2016-057998 A 4/2016
(Continued)

OTHER PUBLICATIONS

US Office Action for U.S. Appl. No. 17/435,487, mailed on Oct. 24, 2023.
(Continued)

*Primary Examiner* — Behrooz M Senfi

(57) ABSTRACT

An information processing apparatus (100) includes: a person detecting unit (102) that executes processing of detecting a person and a location with respect to each of a first image generated in a first camera (5a) and a second image generated in a second camera (5b); a coordinate generating unit (104) that generates coordinates of the location of the detected person; and a determination unit (106) that determines, by using a first location generated from the first image and a second location generated from the second image, whether the person detected from the first image and the person detected from the second image are the same person.

9 Claims, 21 Drawing Sheets

(51) Int. Cl.
| | |
|---|---|
| *G06T 7/292* | (2017.01) |
| *G06T 7/70* | (2017.01) |
| *G06V 10/22* | (2022.01) |
| *G06V 20/60* | (2022.01) |
| *G06V 40/10* | (2022.01) |
| *H04N 23/90* | (2023.01) |
| *G06Q 20/04* | (2012.01) |
| *G06Q 20/12* | (2012.01) |
| *G06Q 30/0601* | (2023.01) |

(52) U.S. Cl.
CPC ............. *G06V 10/22* (2022.01); *G06V 20/60* (2022.01); *G06V 40/103* (2022.01); *H04N 23/90* (2023.01); *G06Q 20/047* (2020.05); *G06Q 20/12* (2013.01); *G06Q 30/0633* (2013.01); *G06T 2207/30196* (2013.01); *G06T 2207/30232* (2013.01); *G06T 2207/30242* (2013.01)

(58) Field of Classification Search
CPC .... G06Q 20/12; G06Q 20/203; G06Q 20/208; G06Q 30/0633; G06T 2207/30196; G06T 2207/30232; G06T 2207/30241; G06T 2207/30242; G06T 7/292; G06T 7/70; H04N 23/90
USPC ......................................................... 348/159
See application file for complete search history.

(56) References Cited

U.S. PATENT DOCUMENTS

| | | | | |
|---|---|---|---|---|
| 2018/0115749 | A1* | 4/2018 | Toshiyuki | ........ G08B 13/19613 |
| 2019/0026560 | A1 | 1/2019 | Nishikawa et al. | |
| 2020/0118401 | A1 | 4/2020 | Zalewski et al. | |
| 2020/0364997 | A1 | 11/2020 | Okamoto et al. | |
| 2022/0139087 | A1* | 5/2022 | Nakamura | ............. H04N 23/90 348/159 |
| 2023/0410514 | A1 | 12/2023 | Nakamura et al. | |
| 2023/0419670 | A1* | 12/2023 | Nakamura | ........... G06V 40/103 |
| 2024/0020979 | A1 | 1/2024 | Nakamura et al. | |
| 2024/0038032 | A1 | 2/2024 | Zalewski et al. | |

FOREIGN PATENT DOCUMENTS

| | | | | |
|---|---|---|---|---|
| JP | 2016-162306 | A | 9/2016 | |
| JP | 2017-157216 | A | 9/2017 | |
| JP | 2018-067755 | A | 4/2018 | |
| JP | 2019-021019 | A | 2/2019 | |
| KR | 20190047748 | A * | 5/2019 | ............... G06T 7/73 |
| WO | 2005/099423 | A2 | 10/2005 | |
| WO | 2012/070010 | A1 | 5/2012 | |
| WO | 2014/103673 | A1 | 7/2014 | |
| WO | WO-2015140853 | A1 * | 9/2015 | ......... G06K 9/00335 |
| WO | 2019/038965 | A1 | 2/2019 | |
| WO | 2019/171572 | A1 | 9/2019 | |

OTHER PUBLICATIONS

International Search Report for PCT Application No. PCT/JP2020/008661, malled on May 12, 2020.

JP Office Action for JP Application No. 2021-504076, mailed on May 7, 2024 with English Translation.

US Office Action for U.S. Appl. No. 18/229,500, mailed on Mar. 6, 2024.

US Office Action for U.S. Appl. No. 18/230,087, mailed on Feb. 28, 2024.

* cited by examiner

INFORMATION PROCESSING APPARATUS, INFORMATION PROCESSING METHOD, AND PROGRAM

CROSS-REFERENCE TO RELATED APPLICATIONS

The present application is a continuation application of U.S. patent application Ser. No. 17/435,487 filed on Sep. 1, 2021, which is a National Stage Entry of PCT/JP2020/008661 filed on Mar. 2, 2020, which claims the benefit of priority from Japanese Patent Application 2019-039015 filed on Mar. 4, 2019, the disclosures of all of which are incorporated in their entirety by reference herein.

TECHNICAL FIELD

The present invention relates to an information processing apparatus, an information processing method, and a program.

BACKGROUND ART

Many systems that determine a flow line where a plurality of persons move in a predetermined space such as a store and a facility, analyze the determined flow line, and execute a behavior analysis have been proposed. A system described in Patent Document 1, for example, computes, by using an image captured by a camera, a flow situation of a person or a prediction value of a flow situation. Further, when movement directions of a plurality of persons are individually predicted, it is difficult to highly accurately estimate, due to occlusion of a camera and the like, a movement direction of a person who temporarily disappears from an image. In this regard, the system described in Patent Document 1 includes a means that extracts, based on movement information indicating a movement history of each of a plurality of persons, at least two persons inferred to move in relation to each other, a means that determines a relationship between the extracted at least two persons, a means that determines, based on the determined relationship information, whether the at least two persons are grouped, and a means that predicts a behavior of each of the at least two persons determined be grouped.

RELATED DOCUMENT

Patent Document

[Patent Document 1] Japanese Patent Application Publication No. 2019-21019

SUMMARY OF THE INVENTION

Technical Problem

As described in Patent Document 1, it is desirable to individually track a flow line highly accurately in a predetermined space with respect to a plurality of persons.

The present invention has been made in view of the circumstance described above, and an object of the present invention is to provide a technique for individually performing a detection of locations of a plurality of persons in a predetermined space highly accurately and efficiently.

Solution to Problem

According to each of aspects of the present invention, in order to solve the above-described problem, the following configuration is employed for each aspect.

A first aspect relates to an information processing apparatus.

The information processing apparatus according to the first aspect includes:

a person detecting unit that executes processing of detecting a person and a location with respect to each of a first image generated in a first camera and a second image generated in a second camera;

a coordinate generating unit that generates coordinates of the location of the detected person; and a determination unit that determines, by using a first location generated from the first image and a second location generated from the second image, whether the person detected from the first image and the person detected from the second image are the same person.

A second aspect relates to an information processing method executed by at least one computer.

The information processing method executed by an information processing apparatus according to the second aspect includes:

executing processing of detecting a person and a location with respect to each of a first image generated in a first camera and a second image generated in a second camera;

generating coordinates of the location of the detected person; and determining, by using a first location generated from the first image and a second location generated from the second image, whether the person detected from the first image and the person detected from the second image are the same person.

Note that, another aspect according to the present invention may be a program that causes at least one computer to execute the method according to the second aspect described above and may be a storage medium readable by a computer that stores such a program. The storage medium includes a non-transitory, tangible medium.

The computer program includes a computer program code that causes, when the computer program is executed by a computer, the computer to execute the information processing method on an information processing apparatus.

Note that, any combination of the components described above and a form acquired by converting an expression according to the present invention among a method, an apparatus, a system, a storage medium, and a computer program are also effective as an aspect according to the present invention.

Further, various types of components according to the present invention may not necessarily exist individually and independently, and the following aspects may be employable: a plurality of components are formed as one member; one component is formed with a plurality of members; a certain component is a part of another component; a part of a certain component and a part of another component are overlapped; and the like.

Further, while, in the method and the computer program according to the present invention, a plurality of steps are described in order, an order of the description does not limit an order for executing a plurality of steps. Therefore, when the method and the computer program according to the present invention are executed, the order of a plurality of steps can be modified without posing an obstacle in content.

Further, it is not limited to execute a plurality of steps of the method and the computer program according to the present invention at timings different individually. Therefore, a case where, while a certain step is executed, another step may occur, a case where an execution timing of a certain step and an execution timing of another step may be overlapped partially or entirely, and another case may occur.

Advantageous Effects of Invention

According to the aspects described above, a technique for individually performing a detection of locations of a plurality of persons in a predetermined space highly accurately and efficiently can be provided.

BRIEF DESCRIPTION OF THE DRAWINGS

The above-described object, other objects, features, and advantages will become more apparent from preferred example embodiments described below and the following accompanying drawings.

DESCRIPTION OF EMBODIMENTS

Hereinafter, example embodiments according to the present invention are described by using the accompanying drawings. Note that, in all the drawings, a similar component is assigned with a similar reference sign and description therefor is not repeated, as appropriate. Note that, in drawings, a configuration of a portion which does not relate to an essence according to the present invention is omitted and therefore is not illustrated.

First Example Embodiment

Figure 1:
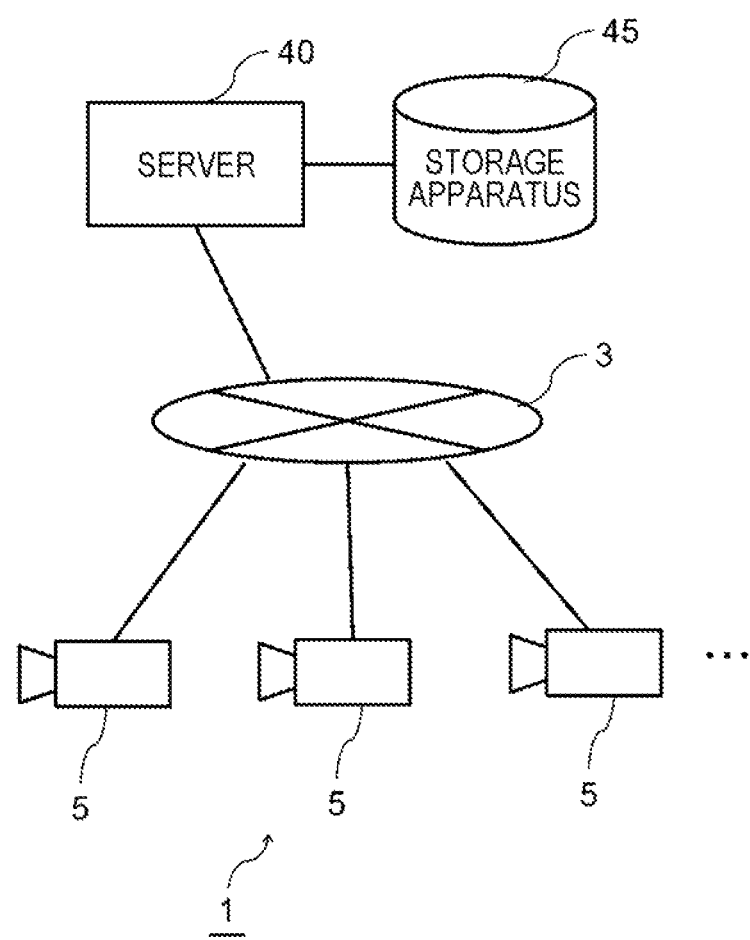
FIG. 1 is a diagram conceptually illustrating a configuration of an information processing system according to an example embodiment of the present invention.
Figure 2:
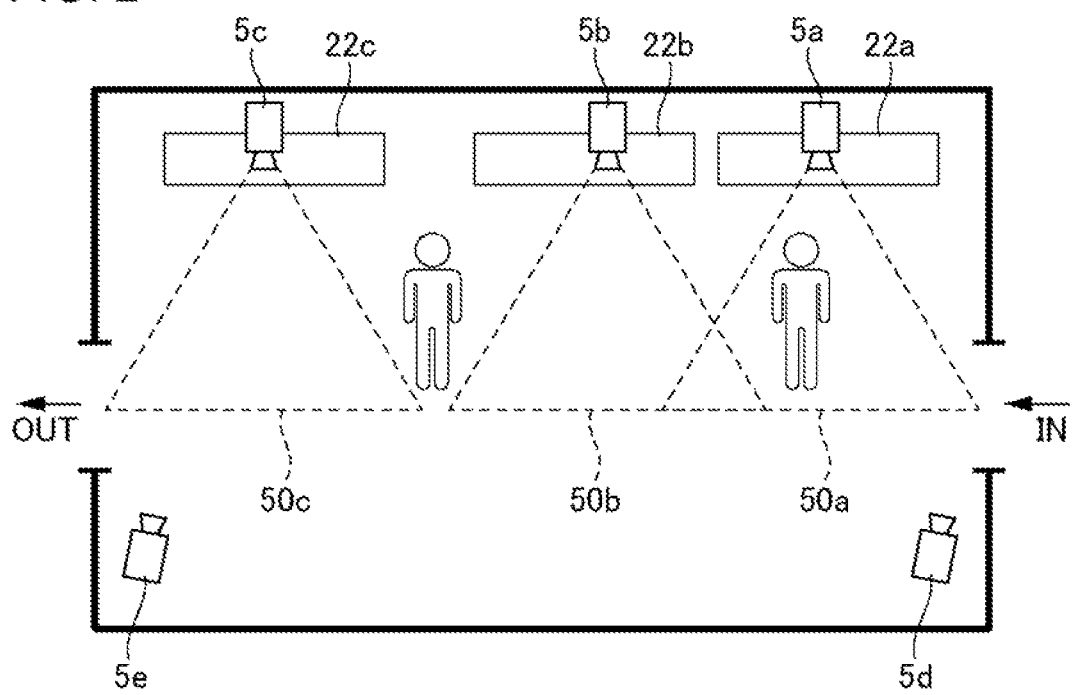
FIG. 2 is a diagram illustrating a disposition example of a product shelving unit and a camera in which a store managed by the information processing system according to the example embodiment is viewed from above.

FIG. 1 is a diagram conceptually illustrating a configuration of an information processing system 1 according to an example embodiment of the present invention. FIG. 2 is a diagram illustrating a disposition example of a product shelving unit 22 and a camera 5 in a store 20. The information processing system 1 captures, by using a plurality of cameras 5, an image of a plurality of persons in a predetermined space such as a store and a facility, and tracks a flow line of each person by using the captured image. The information processing system 1 automatically makes settlement, for example, only based on a procedure of picking up a product from a product shelving unit and putting the product in a cart by a user having entered the store when leaving the store 20. Further, a product may not be necessarily put in a cart, and settlement may be automatically made even by the user's putting a product in their own bag and leaving without doing anything.

The information processing system 1 captures an image of a person having visited the store 20 by using the camera 5 installed in a vicinity of an entrance, determines the person by executing face authentication, and confirms store-entering of the user. Thereafter, also, by using the camera 5 installed for each product shelving unit in the store 20, an image of a person in front of a product shelving unit is captured, and thereby while a user is determined based on face authentication, a flow line indicating a movement path of the user in the store 20 is tracked. In this example, a user is identified based on face authentication and tracked, and therefore the user continues to be tracked as one user from store-entering to leaving.

However, a plurality of persons are present in an actual store 20, and therefore there have been cases where in a middle of processing of tracking, while each person is identified, a flow line of the person and processing of determining a person based on image recognition by using images of a plurality of cameras 5, the person is erroneously recognized as a different person and it is temporarily difficult to execute image recognition, resulting in difficulty in identifying each person and accurately tracking a flow line.

The information processing system 1 according to the present example embodiment can track flow lines of a plurality of persons highly accurately and efficiently by using a plurality of cameras 5.

The information processing system 1 includes a server 40. The server 40 is connected to a communication network 3 via a relay apparatus (not illustrated) such as a router. The server 40 is connected, via the communication network 3, to a plurality of cameras 5a, 5b, . . . (referred to as a "camera 5" unless otherwise specifically discriminated).

Apparatuses on the communication network 3 can be connected via at least either of a wired manner and a wireless manner. A communication means is not specifically limited and various forms are conceivable. For example, a communication means such as a wireless local area network (LAN), a wired LAN. a universal serial bus (USB), a communication means via various types of public lines such as 4th generation (4G), long term evolution (LTE), worldwide interoperability for microwave access (WiMAX), and the like are employable. In the figure, one network is illustrated, but a plurality of different communication networks may be combined.

According to the present example embodiment, in order to identify a plurality of persons in a captured image, it is assumed that, for example, image recognition processing using feature information of a face is executed, but another piece of biological information is usable. For example, feature information of at least one of a face, an iris, or an auricle is usable. Alternatively, information indicating at least one of features including a gait of a person, a stature, a shoulder width, a ratio of a body part, clothes (a shape, a color, a material, and the like), a hair style (including a hair color), an adornment (a hat, eye glasses, an accessary, and the like), belongings (a bag, an umbrella, a stick, and the like), and the like is usable. Alternatively, feature information in which at least two of these pieces of feature information are combined is usable.

The camera 5 includes a lens and an imaging element, such as a charge coupled device (CCD) image sensor, and, for example, is a network camera such as an internet protocol (IP) camara. The network camera includes, for example, a wireless local area network (LAN) communication function and is connected to the server 40 via the communication network 3, i.e., a relay apparatus (not illustrated) such as a router. These cameras 5 each may be a so-called surveillance camera in which a plurality of surveillance cameras are installed in a store and a facility. Then, the camera 5 may include a mechanism of controlling a direction of a camera body and a lens, executing zoom control, executing focusing, and the like by following a motion of a person in harmony with the motion.

The example in FIG. 2 includes at least one camera 5d that captures an image of a person entering the store 20 from an entrance (IN) of the store 20, at least one camera 5e that captures an image of a person leaving an exit (OUT), and a plurality of cameras 5a, 5b, and 5c each that capture an image of a person in front of each of product shelving units (in the figure, product shelving units 22a, 22b, and 22c are indicated but the product shelving unit 22 is referred to unless otherwise specifically discriminated). Further, the camera 5 (not illustrated) that captures an image of a person in a room from a shieling of the store 20 may be included. Note that, FIG. 2 is a disposition diagram in which the store 20 is viewed from above, and therefore, normally, when a person is in an upright position, a top of a head can be viewed, but a person in the figure merely schematically illustrates a presence position of the person, and therefore it is not indicated that a person is in a supine position on a floor.

As illustrated in FIG. 2, the cameras 5a, 5b, and 5c have image-capture ranges 50a, 50b, and 50c (hereinafter, referred to as an image-capture range 50 unless otherwise specifically discriminated), respectively. The image-capture range 50a and the image-capture range 50b of the camera 5a and the camera 5b are partially overlapped, and therefore either one of the cameras can capture an image of a person while the person moving from the product shelving unit 22a to the product shelving unit 22b. On the other hand, the image-capture range 50b and the image-capture range 50c of the camera 5b and the camera 5c are not overlapped, and therefore while a person moves from the product shelving unit 22b to the product shelving unit 22c, there is a region where the person departs from the image-capture range 50, and as a result, it is understood that there is a period in which an image of a person being tracked is not temporarily captured. Even when it is difficult to continuously capture an image of a person since image-capture ranges 50 are separate among a plurality of cameras 50 in this manner, the information processing system 1 according to the present example embodiment can track a flow line of a person. Alternatively, even when a person being tracked slouches, turns his/her back, or hides behind another person or an object, the person can be tracked.

The camera 5 and the server 40 may be directly connected or may be connected via the communication network 3 or the like as described above. For example, image data captured by the camera 5 may be directly transmitted to the server 40, and the server 40 may sequentially receive the image data. Further, a storage unit (not illustrated) accessible by both the camera 5 and the server 40 may be provided. In this case, image data captured by the camera 5 are stored in the storage unit. Then, the server 40 may read image data from the storage unit. Alternatively, the camera 5 may be configured in such a way as to include an image recognition processing function and transmit a recognition result to the server 40.

Herein, image data may be at least either of a still image or a video. A data format, a file format, a file size, an image size, a resolution of an image, a frame rate of a video, and the like are not specifically limited, and various forms are employable according to a specification, a standard, performance, and the like of the camera 5 and the server 40 or a processing capacity, accuracy, and the like of an image analysis. And, at least one frame of the image data may be handled as an image to be described later.

Further, with regard to a timing of transmission of an image from the camera 5 to the server 40, real-time distribution, e.g., streaming distribution is employable, or an image for a predetermined period may be transmitted at a predetermined interval. The transmission timing may be appropriately selected based on a memory capacity of the camera 5 and the server 40, a communication capacity, an image processing ability, a communication situation between the camera 5 and the server 40, and the like, or may be modified in response to a situation change.

The server 40 is connected to a storage apparatus 45. The storage apparatus 45 stores image data received from the camera 5, feature information, tracking information (location information, and the like), and the like. The storage apparatus 45 may be an apparatus separate from the server 40, may be an apparatus included inside the server 40, or may be a combination of the apparatuses.

Figure 3:
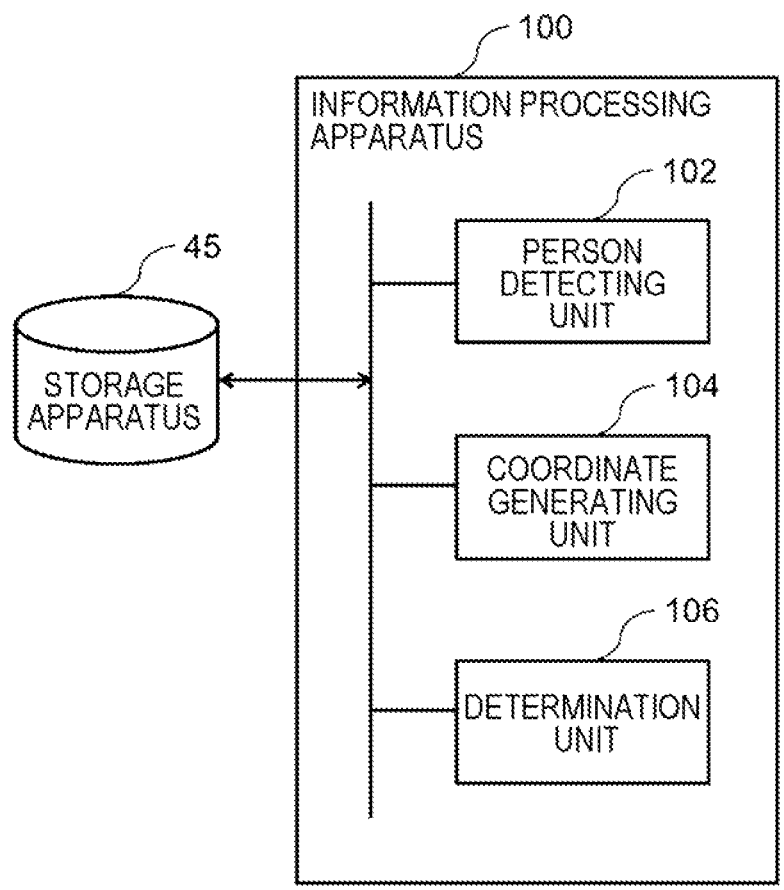
FIG. 3 is a function block diagram illustrating a logical configuration of an information processing apparatus according to the example embodiment.

FIG. 3 is a function block diagram illustrating a logical configuration of an information processing apparatus 100 according to the example embodiment of the present invention.

The information processing apparatus 100 includes a person detecting unit 102, a coordinate generating unit 104, and a determination unit 106. The person detecting unit 102 executes processing of detecting a person and a location with respect to each of a first image generated in the first camera 5a and a second image generated in the second camera 5b. The coordinate generating unit 104 generates coordinates of the location of the detected person. The determination unit 106 determines, by using a first location generated from the first image and a second location generated from the second image, whether the person detected from the first image and the person detected from the second image are the same person.

According to the present example embodiment, the server 40 and the camera 5 include at least one computer. Then, the information processing apparatus 100 is achieved based on a computer included in at least either one of the server 40 and the camera 5 in FIG. 1.

Figure 4:
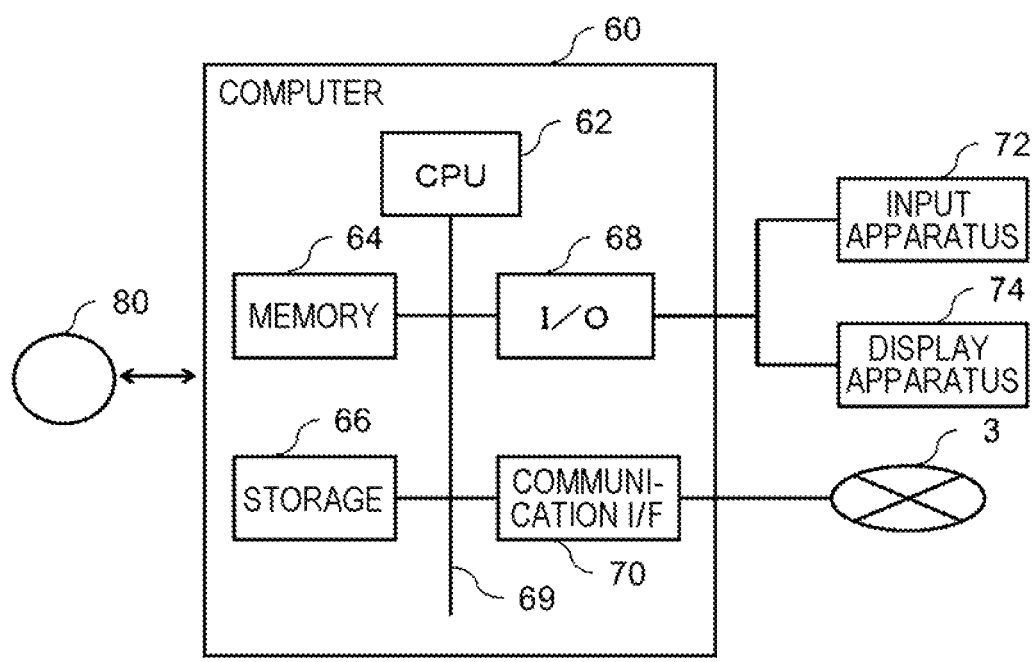
FIG. 4 is a diagram illustrating one example of a configuration of a computer that achieves the information processing apparatus according to the example embodiment.

FIG. 4 is a diagram illustrating one example of a configuration of a computer 60 configuring the server 40 and the camera 5 that achieve the information processing apparatus 100 of the information processing system 1 according to the present example embodiment. The information processing apparatus 100 may be configured by using a plurality of computers 60 or may be achieved based on a virtual server.

The computer 60 includes a central processing unit (CPU) 62, a memory 64, a program 80, being loaded on the memory 64, that achieves a component of each of servers and a user terminal, a storage 66 that stores the program 80, an input/output (I/O) 68, and an interface (communication OF 70) for communication network connection.

The CPU 62, the memory 64, the storage 66, the I/O 68, and the communication I/F 70 are connected to each other via a bus 69, and each of the servers and the user terminal are controlled by the CPU 62. However, a method of mutually connecting the CPU 62 and the like is not limited to bus connection.

The memory 64 is a memory such as a random access memory (RAM) and a read only memory (ROM). The storage 66 is a storage apparatus such as a hard disk, a solid state drive (SSD), or a memory card.

The storage 66 may be a memory such as a RAM and a ROM. The storage 66 may be provided inside the computer 60, or may be provided, when accessible by the computer 60, outside the computer 60 and connected to the computer 60 in a wired manner or a wireless manner. Alternatively, the storage 66 may be attachably/detachably provided in the computer 60.

The CPU 62 reads the program 80 stored in the storage 66 onto the memory 64 and executes the read program 80, and thereby functions of units of the information processing apparatus 100 in FIG. 3 can be achieved.

The I/O 68 executes input/output control for data and a control signal between the computer 60 and another input/output apparatus. The another input/output apparatus includes, for example, an input apparatus 72 such as a keyboard, a touch panel, a mouse, and a microphone connected to the CPU 60, an output apparatus (not illustrated) such as a display (illustrated as a display apparatus 74 in the figure), a printer, and a speaker, and an interface between these input/output apparatuses and the computer 60. Further, the I/O 68 may execute input/output control of data for a read or write apparatus (not illustrated) of another storage medium.

The communication I/F 70 is a network connection interface for performing communication between the computer 60 and an external apparatus. The communication OF 70 may be a network interface for connection to a wired line or may be a network interface for connection to a wireless line. For example, the computers 60 that achieve each of the servers and the user terminal are mutually connected based on the communication I/F 70 via the communication network 3.

Each of components of the information processing apparatus 100 according to the present example embodiment in FIG. 3 is achieved by any combination of hardware and software of the computer 60 in FIG. 4. And, it should be understood by those of ordinary skill in the art that an achieving method and an apparatus for the components include various modified examples. A function block diagram indicating the information processing apparatus 100 according to each example embodiment does not indicate a configuration based on a hardware unit but indicates a block based on a logical function unit.

The CPU 62 of the computer 60 in FIG. 4 reads the program 80 stored in the storage 66 onto the memory 64 and executes the read program, and thereby can achieve functions of units of the information processing apparatus 100 in FIG. 3.

The computer program 80 according to the present example embodiment is described in such a way as to cause the computer 60 for achieving the information processing apparatus 100 to execute a procedure of executing processing of detecting a person and a location with respect to each of a first image generated in a first camera and a second image generated in a second camera, a procedure of generating coordinates of the location of the detected person, and a procedure of determining, by using a first location generated from the first image and a second location generated from the second image, whether the person detected from the first image and the person detected from the second image are the same person.

The computer program 80 according to the present example embodiment may be stored on a storage medium readable by the computer 60. The storage medium is not specifically limited and various forms are conceivable. Further, the program 80 may be loaded onto the memory 64 of the computer 60 from a storage medium, or may be downloaded, through the network 3, onto the computer 60 and loaded onto the memory 64.

The storage medium that stores the computer program 80 includes a non-transitory, tangible medium usable by the computer 60, and a program code readable by the computer 60 is embedded in the medium. When the computer program 80 is executed on the computer 60, the computer 60 is caused to execute an information processing method of achieving the information processing apparatus 100.

Referring back to FIG. 3, each of components of the information processing apparatus 100 is described in details.

Figure 5A:
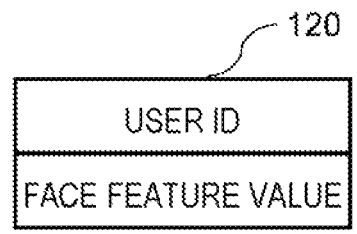
FIGS. 5A to 5C are diagrams each illustrating one example of a data structure of data stored in a storage apparatus connected to the information processing apparatus according to the example embodiment.

The person detecting unit 102 detects, from a captured image, a face region of each person and/or feature information of a face, and detects presence of a person. The person detecting unit 102 further extracts, when detecting a face region, feature information from the face region. Then, the person detecting unit 102 collates the extracted feature information with feature information (indicated as a face feature value in FIG. 5A) previously registered in user information 120 in the figure. When a user is identified based on the collation, a identified user ID is associated with date and time information, and the resulting information is stored, as user identification information, in user detection information 130 in FIG. 5B. As date and time information, at least any one of an image-capture date and time of an image, a reception date and time of an image from the camera 5, a storage date and time in the storage apparatus 45, and a storage date and time of a collation result is exemplified. Further, date and time information is not always required, and information capable of determining an image, e.g., information capable of identifying the camera 5, image data, and an image frame is applicable.

Figure 5B:
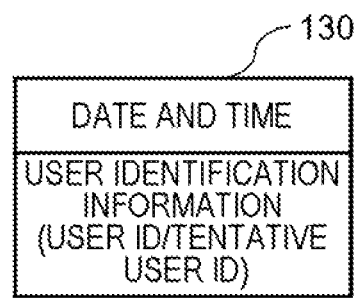
Figure 5C:
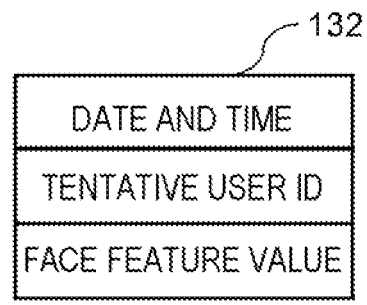

On the other hand, when it is difficult to identify, based on the collation, a user, identification information indicating a person unable to be identified, e.g., a tentative user ID is associated with date and time information, and the resulting information is stored, as user identification information, in user detection information 130 in FIG. 5B. Further, feature information (indicated as a face feature value in FIG. 5C) of a face region of a person unmatched with feature information of a face in the user information 120 is associated with the tentative user ID and date and time information, and the resulting information may be stored in unregistered person information 132 in the figure.

Processing of identifying each person from an image may be repeatedly executed at a predetermined cycle, and may be executed, for example, for each image frame or may be executed at every predetermined time interval (e.g., every several seconds, or the like). The repeating cycle may be appropriately determined according to various conditions such as an image processing ability of the computer 60, the number of cameras 5, and a communication capacity of the communication network 3.

The person detecting unit 102 executes detection and image recognition processing for a person with respect to image data of a plurality of cameras 5 at a predetermined cycle, and the results are stored in the storage apparatus 45 as user detection information 130 or unregistered person information 132.

Figure 6A:
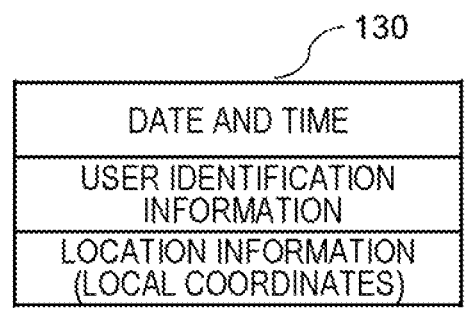
FIGS. 6A and 6B are diagrams each illustrating one example of a data structure of data stored in the storage apparatus connected to the information processing apparatus according to the example embodiment.

A location in an image of each person detected in the person detecting unit 102 is indicated by at least a two-dimensional coordinate system. According to the present example embodiment, it is assumed that the above-described location is further indicated by a three-dimensional coordinate system also including depth. The person detecting unit 102 stores location information (coordinates) further in association with user detection information 130. The user detection information 130 is illustrated in FIG. 6A. Further, the person detecting unit 102 associates, with respect to each camera 5, user detection information 130 with identification information (also referred to as a camera ID) of a camera and stores the resulting information.

The coordinate generating unit 104 acquires, from the person detecting unit 102, information of a location in an image of each person detected in the person detecting unit 102 and generates coordinates of the location of the person. It is assumed that the generated coordinates are at least two-dimensional and are, according to the present example embodiment, three-dimensional coordinates further including depth information. A generation method for coordinates is described later.

A coordinate system indicating a location of a person in an image of each of cameras 5 is different with respect to each camera 5.

Figure 7:
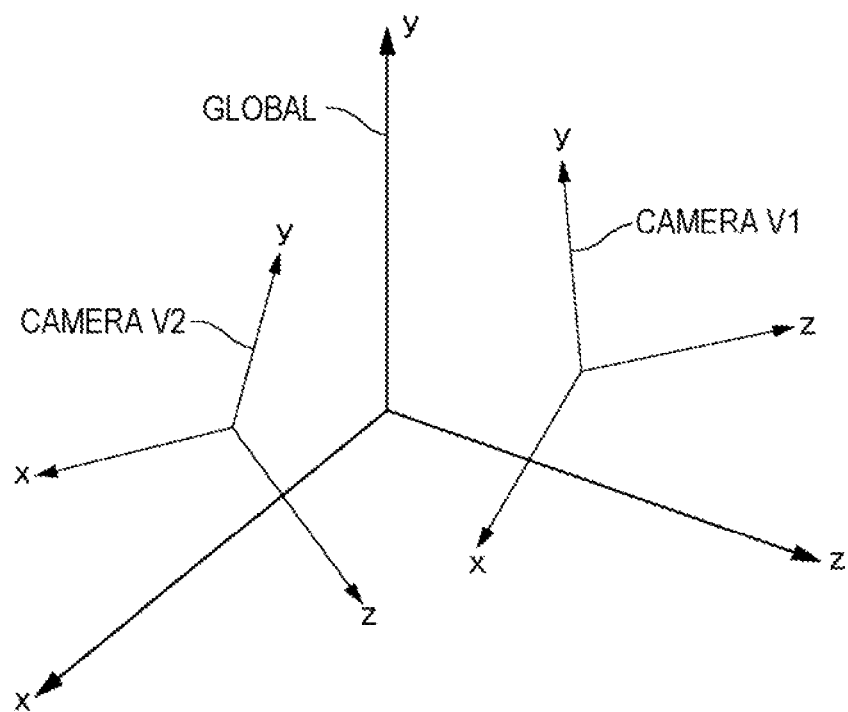
FIG. 7 is s diagram for illustrating a first coordinate system of a first camera and a second coordinate system of a second camera being different from the first camera.

FIG. 7 is a diagram for illustrating a first coordinate system V1 of the first camera 5a and a second coordinate system V2 of the second camera 5b being different from the first camera 5a. A first location indicating a location of a person detected from a first image of the first camera 5a is indicated by a first coordinate system V1 of the first camera 5a. A second location indicating a location of a person detected from a second image of the second camera 5b is indicated by a second coordinate system V2 of the second camera 5b. As illustrated in the figure, two coordinate systems are different from each other, and locations and directions are also different. Note that, it is assumed that a first coordinate system and a second coordinate system each are also referred to as a local coordinate system.

The coordinate generating unit 104 converts a coordinate system for each camera 5 to a common coordinate system in the store 20. In other words, the coordinate generating unit 104 converts each of the first location and the second location to coordinates in a third coordinate system (in the figure, indicated as "global"). The third coordinate system is, but not limited to, coordinates defined, for example, in a real space (e.g., at least a part of a store).

A conversion rule between a local coordinate system and a global coordinate system is previously generated, for example, as follows. First, an object is disposed in each of a plurality of locations previously determined in a global coordinate system and images of objects are captured from each of cameras 5. Next, the images captured by each of the cameras 5 are processed and locations on local coordinates of the objects are determined. Then, from the determined locations and the locations on the global coordinate systems of the objects, a conversion rule between the local coordinate system and the global coordinate system is set for each camera 5. The coordinate generating unit 104 generates, for example, a first conversion rule from a first coordinate system to a third coordinate system and a second conversion rule from a second coordinate system to the third coordinate system.

Figure 6B:
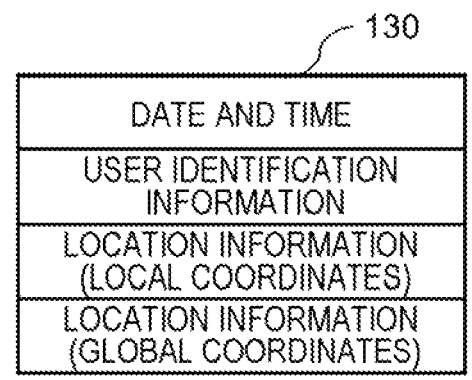

The information processing apparatus 100 further associates pieces of location information (global coordinates) indicated in the generated third coordinate system with user detection information 130 (FIG. 6B) and stores each of pieces of the resulting information in the storage apparatus 45.

The determination unit 106 determines whether persons are the same, by using a location indicated in the third coordinate system, being generated by the coordinate generating unit 104, stored in the user detection information 130. Hereinafter, an example of determination processing based on the determination unit 106 is described in detail.

When, for example, a user ID of a person detected from a first image and a user ID of a person detected from a second image, the persons being detected by the person detecting unit 102, are the same, the persons can be estimated as the same person. However, a case where it is difficult to identify a person by image recognition processing is supposable. Alternatively, a case where a person is identified as a different person is supposable. There are situations, for example, as follows.

(a1) An image is unclear or it is difficult to extract a face region, and therefore it is difficult to acquire, in image recognition processing, a degree of similarity or a degree of likelihood equal to or more than a threshold.

(a2) A person departs from the image-capture range 50 of the camera 5, and therefore the person is not captured in an image.

(a3) Image recognition accuracy decreases due to presence of a plurality of persons.

(a4) Distortion of an image, a computation error, or the like occurs.

The determination unit 106 executes determination processing, based on accumulated user detection information 130. In the accumulated user detection information 130, information of each person is checked in time-series and determination processing is executed, and thereby information of a data record of a person having been temporarily identified as a different person, a person having not been identified, or the like can be updated.

A situation of (a1) described above is described as an example.

Figure 8A:
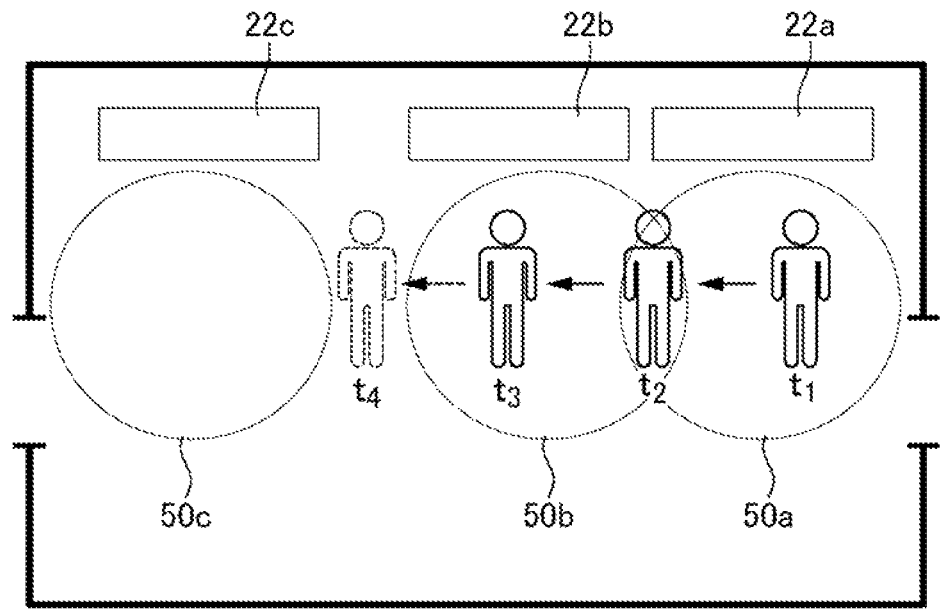
FIGS. 8A and 8B are diagrams each for illustrating a flow line where a person moves in a store.
Figure 9A:
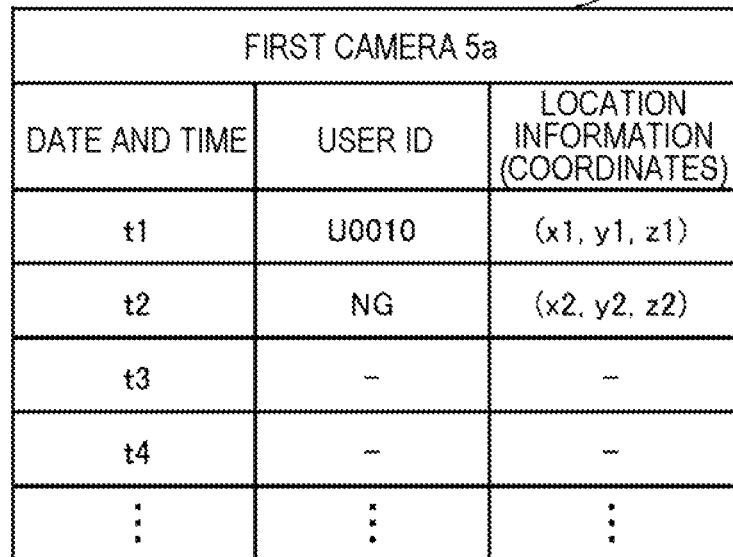
FIGS. 9A and 9B are diagrams each illustrating one example of user detection information stored in the storage apparatus.
Figure 9B:
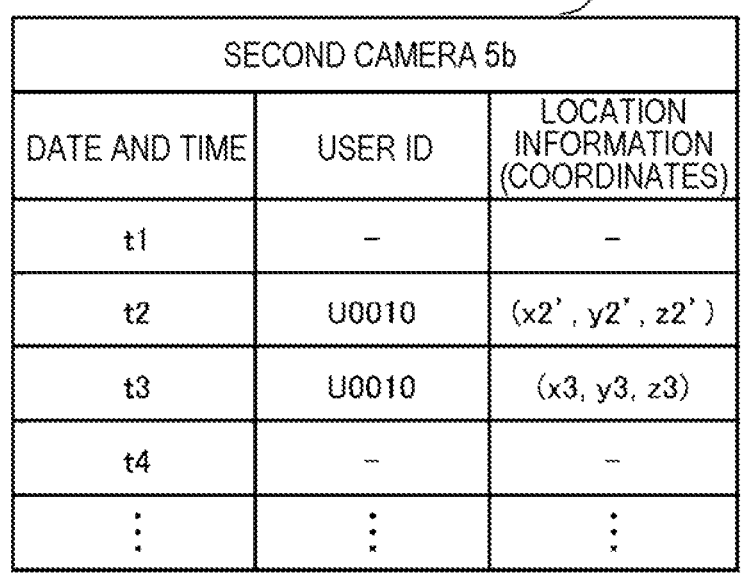

It is assumed that, for example, as illustrated in FIG. 8A, a certain person (a member having a user ID of U0010) moves in a store from a time t1 to a time t3 in an arrow direction. FIG. 9A illustrates a scene where location information of persons identified in an image of the first camera 5a is stored in user detection information 130. FIG. 9B illustrates a scene where location information of persons identified in an image of the second camera 5b is stored in user detection information 130. Note that, each image-capture range 50 in the figures is a range where a person is viewed from a side of a camera 5 installed on each product shelving unit 22.

At a time t1, a person is present in front of the first camera 5a and a user is identified by image recognition processing based on feature information of a face, and as a result, a user ID is stored in the user detection information 130 in FIG. 9A. On the other hand, the person is not present in the image-capture range 50b of the second camera 5b and therefore is not detected at the time t1 in FIG. 9B. Note that, in the example of FIGS. 9A and 9B, there is one person and therefore only one pair of a user ID and location information is stored, but when a plurality of persons are detected, a plurality of pairs of user ID and location information for the plurality of persons are stored.

Next, at a time t2, a person is present in a region where the image-capture range 50a of the first camera 5a and the image-capture range 50b of the second camera 5b are overlapped. In image recognition processing based on feature information of a face of a person extracted from an image captured by the second camera 5b, a user is identified. On the other hand, it is assumed that the person turns his/her back on the first camera 5a and, in image recognition processing based on feature information of a face of a person extracted from an image captured by the first camera 5a, it is difficult to identify a user (in the figure, indicated as "NG").

At a time t3, a person departs from the image-capture range 50a of the first camera 5a, and therefore no one is detected from an image captured by the first camera 5a. On the other hand, the person is present in the image-capture range 50b of the second camera 5b, and therefore a user is identified by image recognition processing and stored in the user detection information 130 in FIG. 9B.

Further, coordinates are generated by the coordinate generating unit 104 from a location of a person detected by the person detecting unit 102. Then, a storage processing unit stores the location information in each piece of the user detection information 130. The determination unit 106 determines, as the same person, for example, persons having the same location information at the same time or located in a reference range. In the example illustrated in FIG. 8A, the determination unit 106 refers to the user detection information 130, and determines, based on time information and location information, that a person having been detected at the time t2 by the first camera 5a but having not identified as a user is the same person as a person having a user ID of a U0010 detected at the time t2 by the second camera 5b.

Note that, in this example, in an image of the first camera 5a, image recognition processing for a person fails, but even when image recognition processing for a person based on the image of the first camera 5a succeeds and image recognition processing for a person in an image of the second camera 5b fails, the determination unit 106 can determine whether to be the same person, similarly to a case where image recognition processing for a person fails in an image of the first camera 5a.

Note that, various determination criteria for the same person are conceivable and the following examples are cited without limitation thereto. Further, determination may be made by combining two determination criteria among the criteria.

(b1) A degree of matching, at the same time, between location information of the user detection information 130 (FIG. 9A) of the first camera 5a and location information of the user detection information 130 (FIG. 9B) of the second camera 5b is computed, and determination is made as the same person when the degree indicates matching at a value equal to or more than a predetermined value.

(b2) When location information of the user detection information 130 of the first camera 5a and location information of the user detection information 130 of the second camera 5b at the same time are not matched at a value equal to or more than a predetermined value, it is assumed that, when user IDs are the same, determination is made as the same person or as a possibility of the same person.

An operation of the information processing apparatus 100 according to the present example embodiment configured in this manner is described below.

Figure 10:
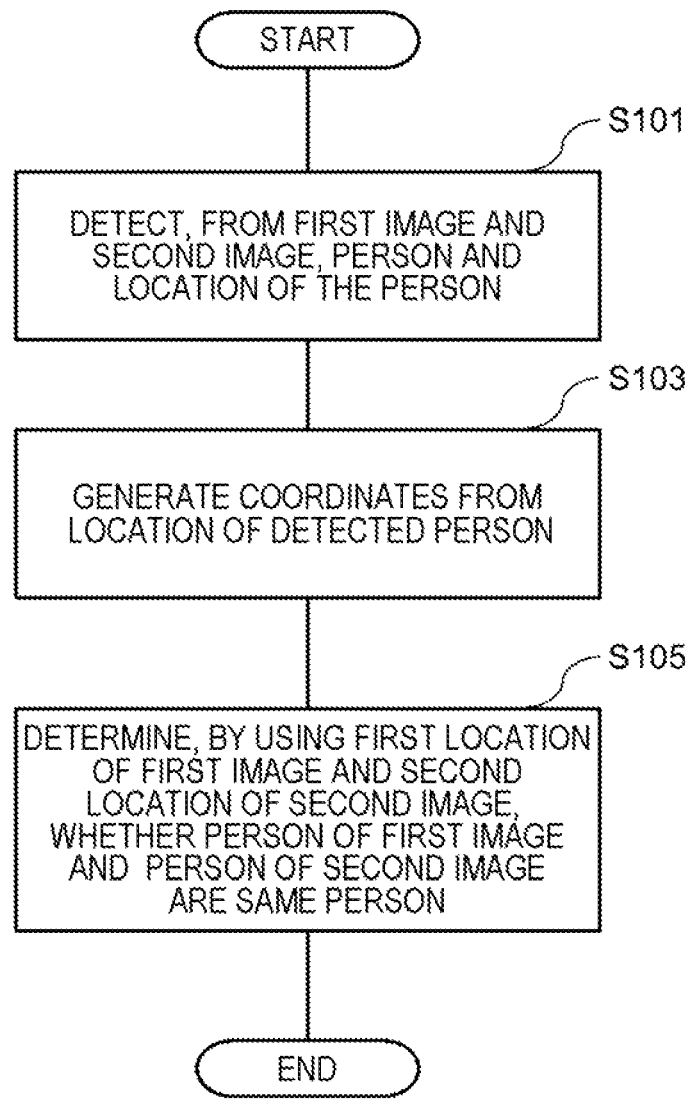
FIG. 10 is a flowchart illustrating one example of an operation of the information processing apparatus according to the example embodiment.

FIG. 10 is a flowchart illustrating one example of an operation of the information processing apparatus 100 according to the present example embodiment.

First, the person detecting unit 102 executes processing of detecting a person and a location with respect to each of a first image generated by the first camera 5a and a second image generated by the second camera 5b (step S101). Next, the coordinate generating unit 104 generates coordinates of the location of the detected person (step S103). The determination unit 106 determines, by using a first location generated from the first image and a second location generated from the second image, whether the person detected from the first image and the person detected from the second image are the same person (step S105).

Herein, each of steps may be executed as a sequential procedure or may be individually executed sequentially. In other words, after step S101 and step S103 are executed as a sequential procedure, processing of S105 may be executed based on accumulated user detection information 130 after user detection information 130 to some extent is accumulated.

As described above, according to the present example embodiment, by using a plurality of cameras 5, locations of a plurality of persons in a predetermined space may be individually detected highly accurately and efficiently.

Second Example Embodiment

An information processing apparatus 100 according to the present example embodiment is similar to the information processing apparatus 100 according to the first example embodiment except that, as a determination criterion for the same person, (c1) and (c2) described below are further used.

(c1) When times of user detection information 130 of FIG. 9A and FIG. 9B deviate from each other or when a person is not detected at the same time, a location of a first person is estimated from a history of a location of at least the first person, and the estimation result is used. For example, a certain reference time is defined and location information at the reference time of a first person is estimated. Then, at the reference time, when a degree of matching between the estimated location information of the first person and a detection value of location information or estimated location information of a second person satisfies a reference, it is determined that the first person and the second person are the same person.

(c2) In the case of (c1) described above, even when estimated locations of persons are not matched at a value equal to or more than a predetermined value, determination is made, when user IDs are the same, as the same persons or as a possibility of the same person.

The information processing apparatus 100 estimates, when, for example, a person is temporarily absent between images of different cameras 5, a movement location of the person, based on movement vectors of persons, and determines whether persons of the images of the different cameras 5 are the same.

As one example, a determination unit 106 determines whether persons are the same, by using a movement vector of a person generated by using a plurality of first images, a time from a time when the person is not detected in a first image to a time when a new person is detected in a second image, and a location of the new person.

Figure 11A:
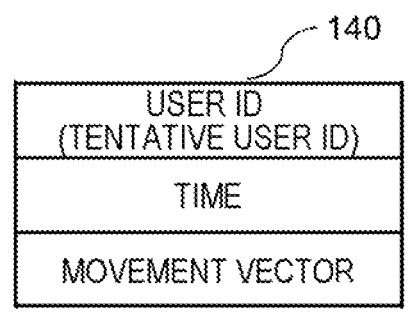
FIGS. 11A and 11B are diagrams each illustrating one example of a data structure of data stored in the storage apparatus connected to the information processing apparatus according to the example embodiment.

The determination unit 106 generates, by using a plurality of first images 52a, a movement vector (or a movement direction and a movement velocity) of each of persons, associates a user ID (or a tentative user ID) with time information, and stores the resulting information in a storage apparatus 45 as flow line information 140 in FIG. 11A. As the flow line information 140, a movement vector is accumulated by being associated with time information every time being detected for each person.

Figure 12:
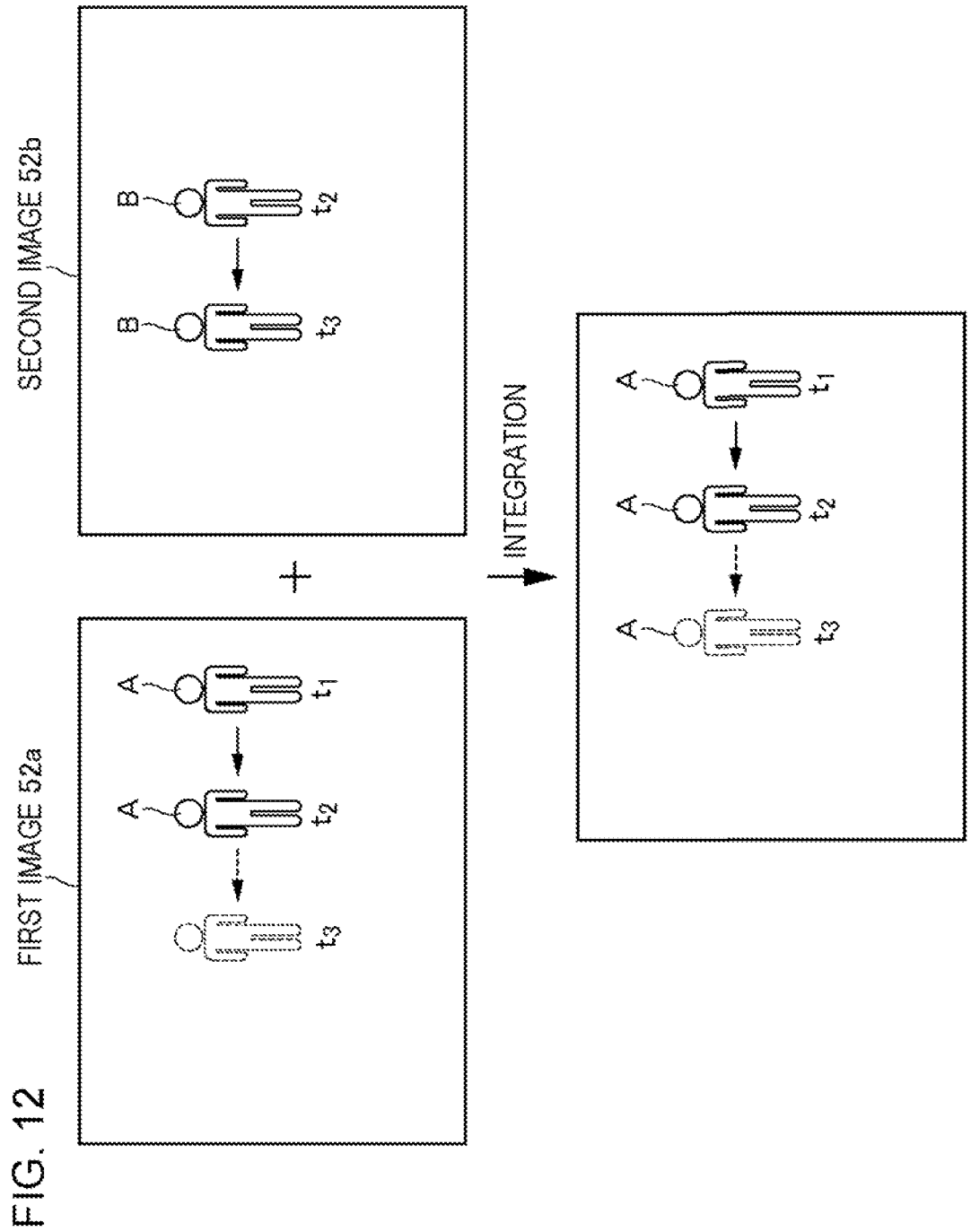
FIG. 12 is a diagram for illustrating person detection and integration processing of the information processing apparatus according to the example embodiment.
Figure 13:
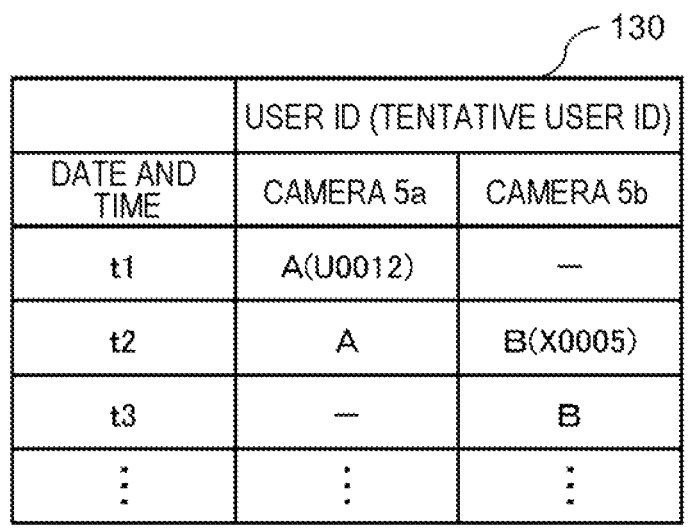
FIG. 13 is a diagram illustrating one example of user detection information generated based on images of cameras different from each other in the information processing apparatus according to the example embodiment.

As illustrated in FIG. 12 and FIG. 13, in image recognition processing in the first image 52a, a user A having a user ID as U0012 is identified at a time t1 and a time t2. At a time t3, the user A having been identified so far is not recognized. On the other hand, in image recognition processing in a second image 52b, a person is not detected until the times t1 and t2, but at the time t3, a person identified as a user B having a tentative user ID as X0005 appears.

Figure 11B:
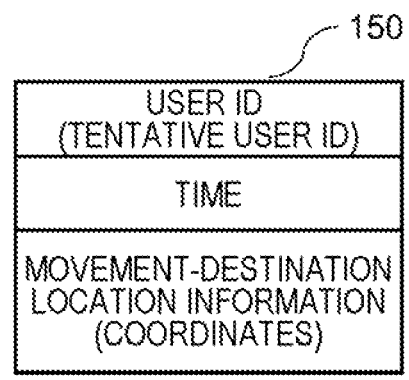

In this example, the determination unit 106 computes a movement vector from location information of the user A detected in the first image 52a. Then, the determination unit 106 computes a time after the user A is not detected in the first image 52a and until the user B is detected in the second image 52b, and estimates a location of a movement destination of a user from the movement vector of the user A and the computed time. A movement amount is estimated, for example, by multiplying a movement vector by a computed time, and the estimated movement amount is added to newest location information (e.g., location information at the time t2) of the user A, and thereby a location of the user A is estimated. The estimated location information (movement-destination location information) is stored in the storage apparatus 45 as estimated information 150 in FIG. 11B. As the estimated information 150, every time location information is estimated for each person, estimated location information is accumulated in association with time information.

The determination unit 106 determines whether an estimated location and a location of the user B detected in the second image 52b are matched, and makes determination, when being matched, as the same person. The determination unit 106 computes, for example, a degree of matching between an estimated location of the user A and a detected location of the user B, and determines, when the degree indicates matching at a value equal to or more than a predetermined value, that the users are the same person.

Further, an example of (c2) described above is described.

Figure 8B:
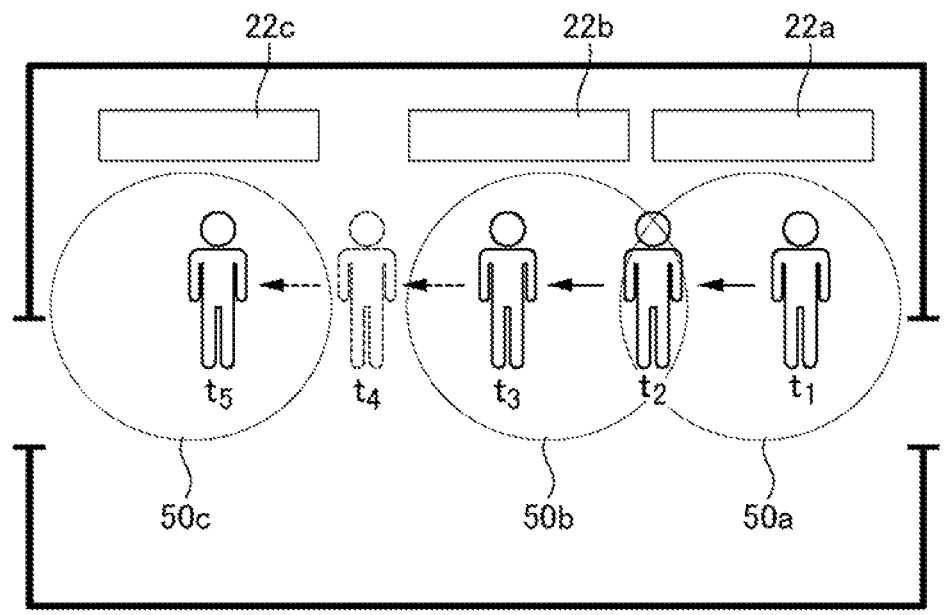

It is assumed that, as illustrated in FIG. 8B, a person (a member having a user ID as U0010) further moves from a state of FIG. 8A and moves in a store in an arrow direction from a time t3 to a time t5. At the time t3, a person is present in an image-capture range 50b of a second camera 5b, and therefore a user is identified by image recognition processing and the resulting information is stored in user detection information 130 in FIG. 9B. However, at a time t4, a person departs from the image-capture range 50b of the second camera 5b, and therefore the person is not detected from an image captured by the second camera 5b. On the other hand, a person departs from an image-captured range 50c of a neighboring camera 5c, and therefore the person is not either detected from an image captured by the camera 5c.

Further, at a time t5, a person moves up to the image-capture range 50c of the camera and therefore when a person is identified by image recognition processing as a member having a user ID as U0010, the determination unit 106 determines that the person detected in the camera 5b and the person detected in the camera 5c are the same person.

As described above, according to the present example embodiment, when a movement location of a person is estimated based on movement vectors of persons, it can be determined whether persons detected based on images of a plurality of different cameras 5 are the same, and therefore similarly to the example embodiments described above, using a plurality of cameras 5, locations of a plurality of persons in a predetermined space can be individually detected highly accurately and efficiently. In determination of a person based on a captured image, it can be avoided that, for example, it is difficult to determine a person since image recognition is not temporarily executable and detection accuracy of a person location decreases.

Third Example Embodiment

Figure 14:
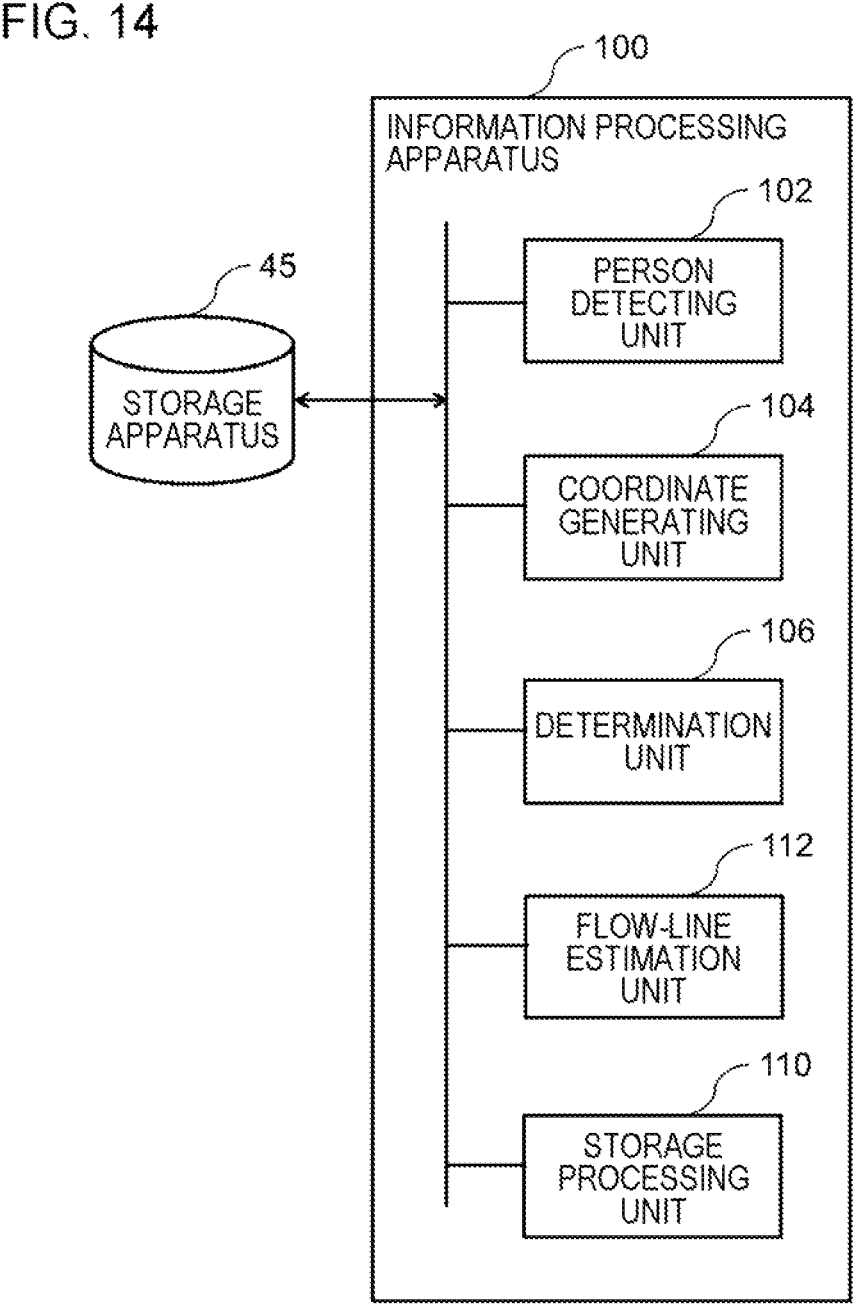
FIG. 14 is a function block diagram illustrating a logical configuration of the information processing apparatus according to the example embodiment.

FIG. 14 is a function block diagram illustrating a logical configuration of an information processing apparatus 100 according to the present example embodiment.

The information processing apparatus 100 according to the present example embodiment is similar to any of the example embodiments described above except that a configuration for estimating a flow line of a person by using a movement vector of the person generated by using a plurality of images is included.

The information processing apparatus 100 according to the present example embodiment includes, similarly to the information processing apparatus 100 in FIG. 3, a person detecting unit 102, a coordinate generating unit 104, and a determination unit 106 and further includes a flow-line estimation unit 112. Further, in the present figure, the information processing apparatus 100 includes a storage processing unit 110.

The flow-line estimation unit 112 estimates, by using a movement vector (flow line information 140 in FIG. 11A) of a person generated by using a plurality of images captured in at least one of a plurality of cameras 5, a flow line of the person. Then, the determination unit 106 may compare estimated flow lines of persons and make determination as being the same person when a degree of matching with a flow line of a different person (different in user ID) has a value equal to or more than a predetermined threshold.

Estimation processing for a movement destination based on the determination unit 106 according to the example embodiments described above may be executed by the flow-line estimation unit 112. Flow line information estimated by the flow-line estimation unit 112 is stored in estimated information 150. In other words, flow line information is accumulated as location information for each time with respect to each user.

The storage processing unit 110 integrates, when while in user detection information 130, persons are stored as a plurality of persons different from each other, the determination unit 106 determines that the persons are the same person, pieces of location information of the plurality of persons into location information of one person. In other words, the storage processing unit 110 integrates pieces of location information of persons determined as the same person by the determination unit 106 into location information of one person and updates a data record of the user detection information 130.

Herein, matching between flow lines is described by citing an example. It is assumed that figures in FIGS. 15A to 15F each indicate flow lines of different users in the same period.

Figure 15A:
FIGS. 15A to 15F are diagrams each illustrating a pattern of a flow line of each of a plurality of persons.
Figure 15B:
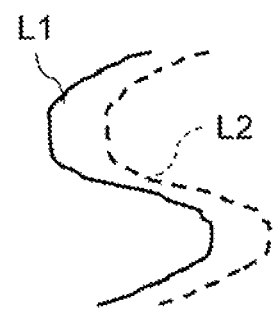
Figure 15C:
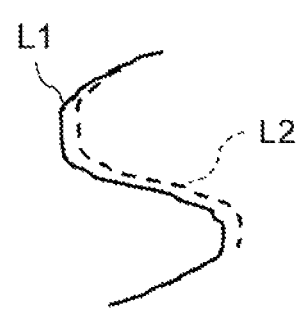

In an example of FIG. 15A, a degree of matching between two flow lines being a flow line L1 and a flow line L2 is equal to or more than a threshold, and therefore the two users are determined by the determination unit 106 as being the same person and pieces of location information of the two users are integrated. In an example of FIG. 15B, a degree of matching between two flow lines being a flow line L1 and a flow line L2 is less than a threshold, and therefore the two users are determined as being not the same person. Therefore, pieces of location information are not integrated. In an example of FIG. 15C, a period of one flow line L2 is a part of a period of the other flow line L1 and a degree of matching between the flow lines is equal to or more than a threshold with respect to the same period, and therefore the two users are determined as being the same person and pieces of location information of the two users are integrated.

Figure 15D:
Figure 15E:
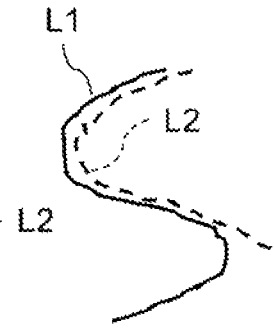
Figure 15F:
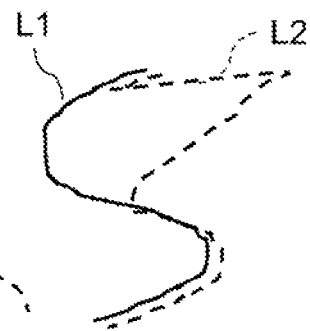

In an example of FIG. 15D, a period of one flow line L2 is earlier in start time and termination time than a period of the other flow line L1, and therefore the periods of the two flow lines deviate. However, with regard to a matched period, a degree of matching between the two flow lines is equal to or more than a threshold, and therefore the two users are determined as being the same person and pieces of location information of the two users are integrated. In an example of FIG. 15E, while a degree of matching between period-anterior half portions of two flow lines being a flow line L1 and a flow line L2 is equal to or more than a threshold, a degree of matching between period-posterior half portions is less than a threshold. In this case, it is conceivable that an accompanying person acts separately from midway, and therefore two persons are determined as being not the same person. Therefore, pieces of location information are not integrated. In an example of FIG. 15F, in a part of a period of each of two flow lines being a flow line L1 and a flow line L2, one flow line L1 and the other flow line L2 deviate in flow line to a large extent. A period deviating by a value equal to or more than a predetermined value is equal to or more than a predetermined value, and therefore a degree of matching between the two flow lines being the flow line L1 and the flow line L2 is less than a threshold and the two users are determined as being not the same person. Therefore, pieces of location information are not integrated.

Figure 16:
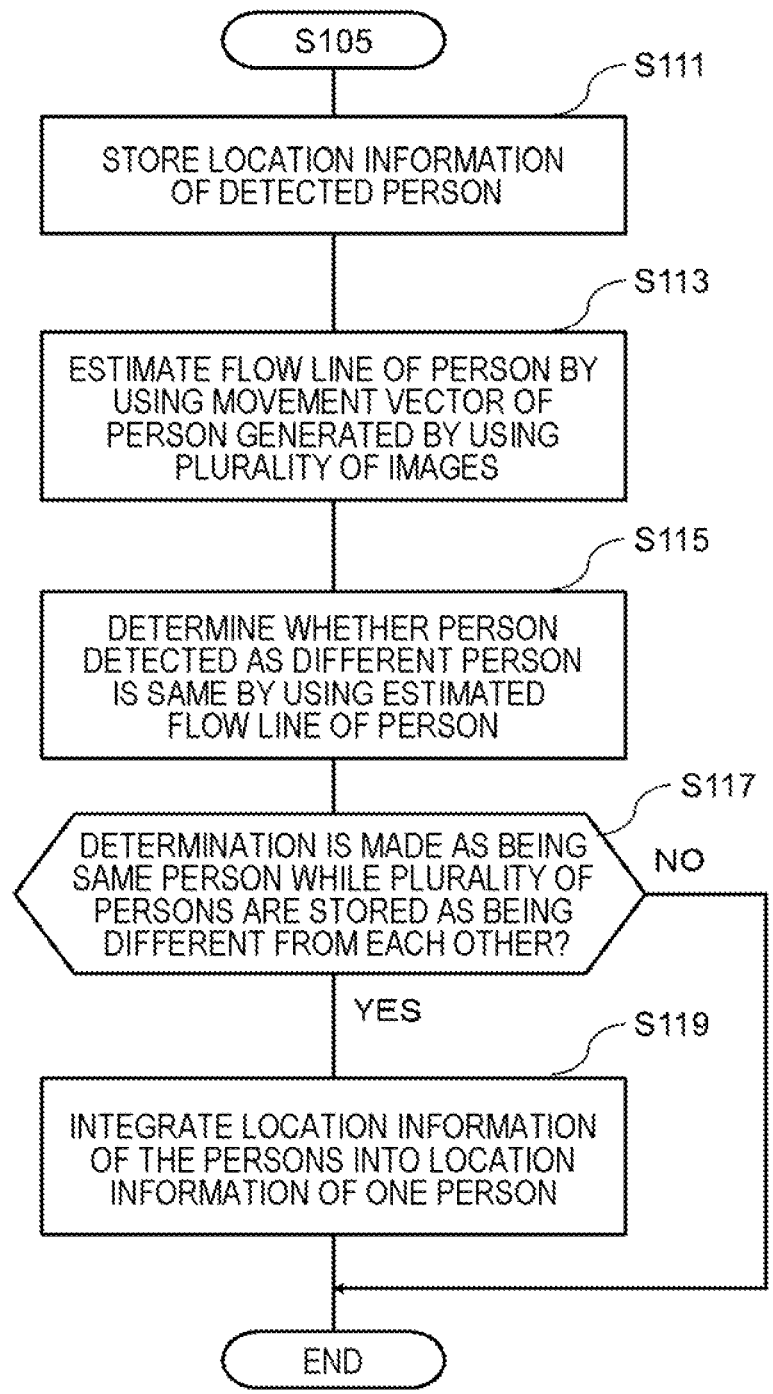
FIG. 16 is a flowchart illustrating one example of an operation of the information processing apparatus according to the example embodiment.

FIG. 16 is a flowchart illustrating one example of an operation of the information processing apparatus 100 according to the present example embodiment. A procedure of an operation illustrated by the present flow indicates details of processing for determination processing (step S105) described according to the example embodiments described above.

First, the storage processing unit 110 stores location information of a detected person in a storage apparatus 45 by person (step S111). Then, the flow-line estimation unit 112 estimates, by using a movement vector of a person generated by using a plurality of images, a flow line of the person (step S113). The estimated flow line is stored in the storage apparatus 45 as estimated information 150. Then, the determination unit 106 determines whether a person detected as a different person is the same by using the estimated flow line of the person (step S115).

The storage processing unit 110 integrates, when while being stored as a plurality of persons different from each other, the persons are determined as being the same person in step S115 (YES in step S117), pieces of location information of the persons into location information of one person (step S119).

As described above, according to the present example embodiment, an advantageous effect similar to the example embodiments described above is exerted and in addition, flow lines of a plurality of persons can be tracked highly accurately and efficiently by using a plurality of cameras 5.

When, for example, persons are identified, based on a plurality of cameras 5, as different persons and flow lines are the same, based on flow lines of a plurality of persons being individually subjected to flow line tracking, it is determined whether to be the same person, and when determination is made as being the same person, integration into information of one person can be executed. Even when, for example, persons are erroneously recognized, based on a plurality of cameras 5, as different persons, data can be integrated later as the same person, and therefore determination accuracy for a person and a flow line of a person increases.

Fourth Example Embodiment

An information processing apparatus 100 according to the present example embodiment is similar to any of the example embodiments described above except that a configuration for executing settlement processing, as a purchased product of a customer, for a product picked up by a person being the customer in a store 20 is included. An information processing system 1 according to the present example embodiment provides a service in which, in the store 20 or a facility such as a shopping mall (hereinafter, the store 20 is described as a representative), a customer being previously registered for use can do shopping based on so-called walk-through. Further, even for a user being not previously registered for use, product registration in a product list is made only by picking up a product from a product shelving unit 22, and therefore payment processing may be executed, based on the registered product list, at a leaving time.

Figure 17:
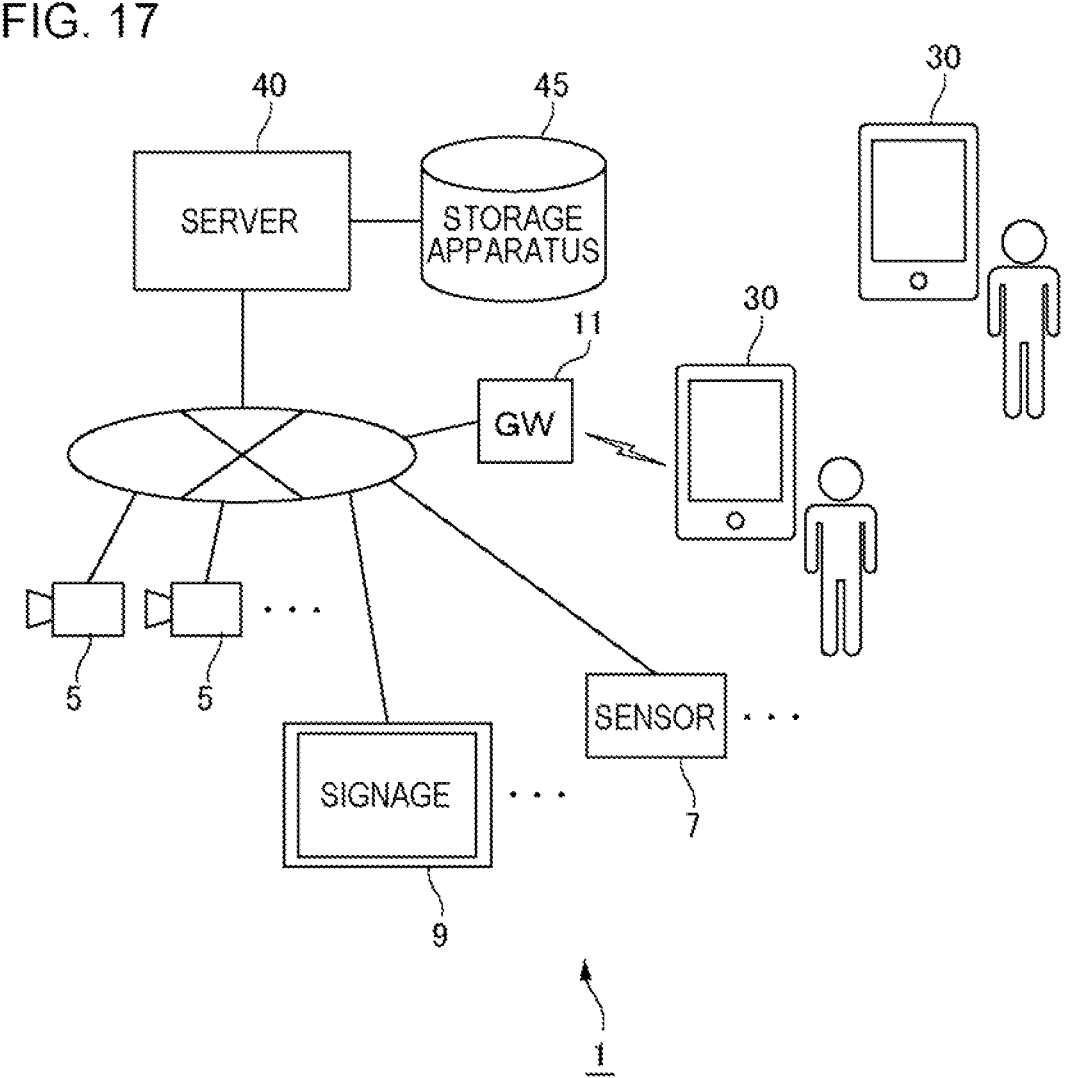
FIG. 17 is a diagram conceptually illustrating a configuration of the information processing system according to the example embodiment of the invention.

FIG. 17 is a diagram conceptually illustrating a configuration of the information processing system 1 according to the present example embodiment.

According to the present example embodiment, the information processing system 1 further includes, in addition to the configuration of the information processing system 1 according to the example embodiments described above in FIG. 1, a plurality of sensors 7 that each detect that a product is picked up from the product shelving unit 22. Each of the sensor 7 is connected to a server 40 via a communication network 3. Further, the server 40 may be connected to a digital signage 9 via the communication network 3. In the digital signage 9, a guide for the store 20, event information, a product, a company advertisement, and the like may be displayed.

According to the present example embodiment, a person is a user using the store 20 and uses the store 20 by carrying a user terminal 30. The user terminal 30 is, for example, a smartphone, a tablet terminal, a mobile phone, or a personal digital assistant (PDA), and is any mobile terminal including a communication function without specific limitation. Further, the user terminal 30 may be a possession of a user or may be, for example, a terminal rented to a user in the store 20. The user terminal 30 may be connectable to the server 40 or the Internet (not illustrated) via a gateway (GW) 11 and the communication network 3.

The user terminal 30 includes at least one computer 60 illustrated in FIG. 4. A user is previously registered as a user in order to use a service provided by the information processing system 1 according to the present example embodiment in the store 20. As a user registration method, for example, by using a user terminal 30 of a user, a dedicated application is started and the server 40 is connected or by using a browser or the like, a predetermined website is accessed and a user registration screen is displayed on the user terminal 30, and thereby a registration can be made. A user previously sets authentication information such as a user ID and a password, inputs, at a time of using a service, the authentication information to a log-in screen by using the user terminal 30, and logs in the present information processing system 1. Note that also, according to the present example embodiment, the present system can be used without registration for use, similarly to the example embodiments described above. In this case, similarly to the example embodiments described above, by using feature information of a face of a person, a person is identified.

Further, a user registers feature information for identifying a user by image recognition processing. For example, by using a camera of the user terminal 30, an image of a face is captured and thereby image data may be registered. The server 40 stores, in a storage apparatus as user information 120 (FIG. 5A), feature information of a face extracted from a registered face image in association with user identification information.

Information to be registered is not limited to these, and personal information (a name, an address, a contact, age, gender, and the like) of a user is further included. Authentication information and update information may be stored in association with user information 120.

Figure 18:
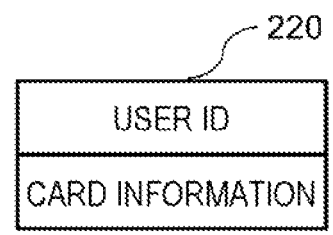
FIG. 18 is a diagram illustrating one example of a data structure of data stored in the storage apparatus connected to the information processing apparatus according to the example embodiment.

Further, a user also registers card information of a credit card used in card settlement for a price of shopping. Settlement card information received from a user is associated with user identification information and is stored in the storage apparatus 45 as card information 220 in FIG. 18. The card information includes information required for card settlement and includes information, for example, such as a card type, a card number, a password, a name, and an expiration period.

Figure 19:
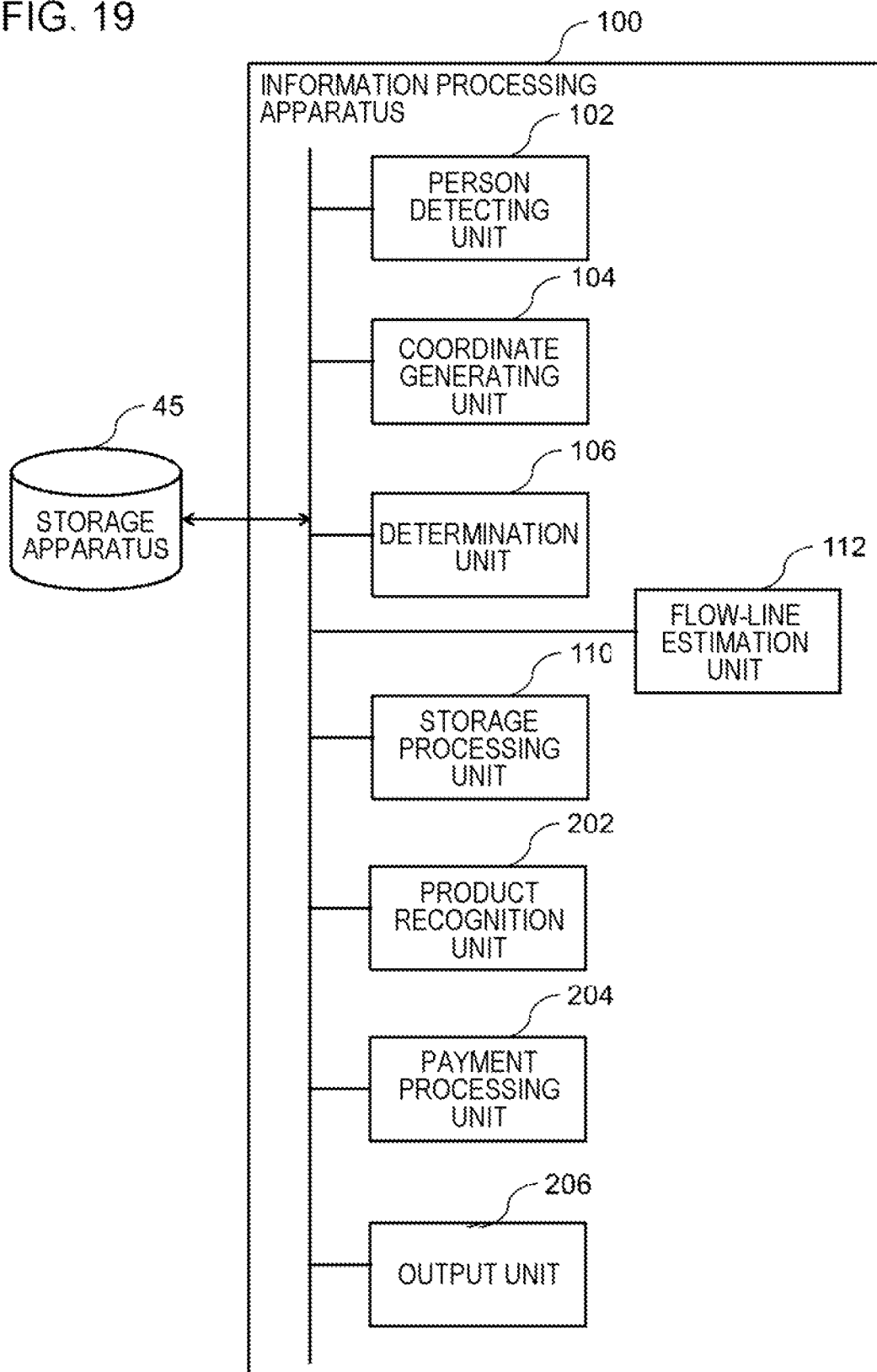
FIG. 19 is a function block diagram illustrating a logical configuration of the information processing apparatus according to the example embodiment.

FIG. 19 is a function block diagram illustrating a logical configuration of the information processing apparatus 100 according to the present example embodiment.

The information processing apparatus 100 according to the present example embodiment further includes, in addition to the configuration of any one of the information processing apparatuses 100 according to the example embodiments described above, a product recognition unit 202, an payment processing unit 204, and an output unit 206. In the figure, an example of a combination with the information processing apparatus 100 in FIG. 14 is illustrated.

The product recognition unit 202 infers or recognizes a product picked up by a person from the product shelving unit 22, generates a product list by associating the inferred or recognized product with a flow line of the person, and stores the generated product list in the storage apparatus 45. The product recognition unit 202 infers or recognizes a product by using the sensor 7. The sensor 7 includes a depth sensor that detects a motion of a hand of a person located in front of the product shelving unit 22 and a weight sensor that detects a weight of an article placed on a shelf of the product shelving unit 22.

A method of inferring or recognizing a product by using the product recognition unit 202 is as follows. First, the product recognition unit 202 detects, by using a depth sensor 7, a motion of a hand of a person located in front of the product shelving unit 22, and determines, from the motion of the hand of the person, a location where an article is picked up from a shelf. Then, the product recognition unit 202 infers, based on a weight change of the shelf of the product shelving unit 22 detected by the weight sensor, a type of the article picked up from the shelf. Then, the product recognition unit 202 outputs, based on planogram information, article determination information determining an article disposed on a shelf, e.g., an ID (code information in some cases) allocated to the article or an article name (e.g., a product name) of the article.

Alternatively, the product recognition unit 202 may collate, based on image recognition processing, an article picked up by a person whose image is captured by a camera 5 with a feature value of an article image previously registered, and determine the article, based on the result. Recognition processing of a product based on the product recognition unit 202 may be repeated until settlement processing to be automatically executed when a person leaves from the store 20 is executed. Therefore, when a person picks up a plurality of products from a shelf, the product recognition unit 202 additionally stores, in a product list by person, a picked-up product every time picked up. The product list is associated with a flow line of the person. However, the product list may be associated with identification information of the person. In this case, identification information of a person is associated with flow line information.

The payment processing unit 204 executes, based on a product list, payment processing for the person. The payment processing unit 204 executes card settlement by using card information 220 in FIG. 18 of the person. The settlement processing may be executed by using, as a trigger, a fact that, for example, an image of a person is captured by a camera 5e installed at an exit (OUT) of the store 20 and face recognition is made. The payment processing unit 204 may be an external apparatus separate from the information processing apparatus 100. A configuration in which payment processing is instructed from the information processing apparatus 100 to an external apparatus and an payment processing result is received from the external apparatus may be made.

Note that, before settlement processing, a customer can read a product list by using a user terminal 30 of the customer. The user terminal 30 of a customer transmits, for example, a user ID of the customer to the information processing apparatus 100. The output unit 206 transmits a product list of a person relevant to the user ID to the user terminal 30 of the person. At that time, a product code of the product list may be converted to a product name. Further, together with a product name, a price of the product may be transmitted. In the latter case, a total amount of money of registered products may be further transmitted to the user terminal 30 of the customer.

The transmitted product list is displayed in the user terminal 30 of the customer. A screen of the terminal may include, for example, an operation button for accepting a content and an amount of money of a purchased product and executing settlement processing, an operation button for making a content modification of a purchased product, and the like.

The output unit 206 outputs an electronic receipt based on payment processing. The electronic receipt may be transmitted to the user terminal 30 of each person. The electronic receipt is transmitted, for example, to a previously registered address with respect to each person. Further, when a customer is registered as a user, the customer may log in a website where customer information can be browsed and confirm a purchase history.

Figure 20:
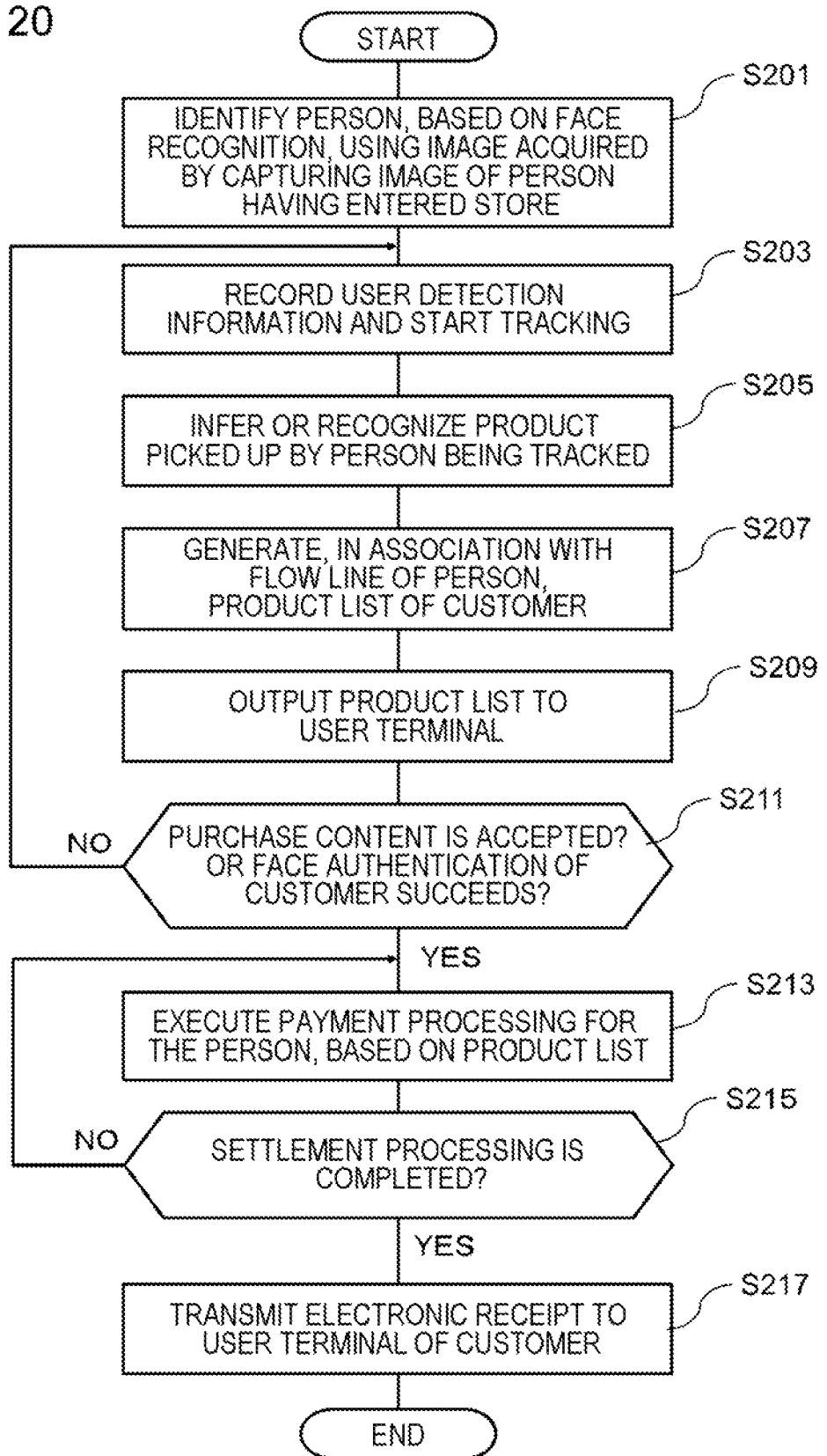
FIG. 20 is a flowchart illustrating one example of an operation of the information processing apparatus according to the example embodiment.

FIG. 20 is a flowchart illustrating one example of an operation of the information processing apparatus 100 according to the present example embodiment.

First, a person detecting unit 102 identifies a person, based on image recognition processing for a face, from an image of a person who enters the store 20 captured by using a camera 5d provided at an entrance (IN) of the store 20 (step S201). Then, the person detecting unit 102 registers a user ID of a identified person or a feature value of a face of a person unable to be identified, and a flow-line estimation unit 112 starts tracking the person (step S203).

The product recognition unit 202 infers or recognizes a picked-up product from a motion of the person being tracked (step S205). Then, the product recognition unit 202 associates the inferred product with a flow line of the person, and generates a product list of a customer (step S207). Step S205 and step S207 are repeatedly executed and are repeated until payment processing is executed.

The output unit 206 outputs a product list to the user terminal 30 (step S209). When a customer accepts a purchase content or face authentication for a customer succeeds (YES in step S211), the payment processing unit 204 executes, based on the product list, payment processing (herein, card settlement processing) for the person (step S213). The output unit 206 transmits, when the settlement processing is completed (YES in step S215), an electronic receipt to the user terminal 30 of the customer (step S217).

Until a content of the customer is accepted or face authentication succeeds in step S211, processing is repeated by returning to step S203. Further, when settlement processing is not completed in step S215, predetermined exceptional processing may be executed after a given time elapses. The predetermined exceptional processing is processing of reporting a fact that settlement processing is not completed, in addition, a reason for incompletion, and the like to a customer or an administrator of the store 20, and the like. The output unit 206 transmits, to the user terminal 30, a message in that, for example, "Since an expiration date of a registered credit card has expired, settlement processing is not completed. Please, confirm credit card information and update the information", and the like.

Note that, according to the present example embodiment, flow-line estimation processing and location-information integration processing described according to the example embodiments described above may be executed based on a processing flow separately from the processing flow described above. In other words, flow-line estimation processing of referring to location information for each person determined and stored based on the processing flow and thereby interpolating the missing data described above or correcting erroneously detected data, location-information integration processing of integrating pieces of location information of a plurality of persons, and the like are executed. The processing flow in FIG. 20 and a processing flow of flow-line estimation processing and location-information integration processing may be executed in parallel on a real-time basis or may be executed at timings different from each other.

Hereinafter, combinations of timings for each of pieces of processing are exemplified.

(d1) Person determination (flow line estimation) and product inference or product recognition are processed in parallel.

In this configuration, the information processing apparatus 100 further includes a determination unit (not illustrated) that determines a person flow line to be associated with a recognized or inferred product. The determination unit determines a flow line of a person associated with identification information or feature information of a person identified, by the person detecting unit 102, based on image recognition of a person being present in front of a product shelving unit 22, and associates the determined flow line of the person with identification information of a product inferred or recognized as being picked up by the person in front of the product shelving unit 22. The determination unit determines a person, for example, by using, as a trigger, a fact that it is detected that a product is picked up by the person in front of the product shelving unit 22 and the picked-up product is inferred or recognized. The product recognition unit 202 may associate a flow line of the determined person with product information.

(d2) Product inference or recognition is executed after person determination is completed.

In this configuration, the product recognition unit 202 executes processing of detecting a motion of a hand of a person by using, as a trigger, a fact that, among persons being tracked in the store 20, determination of a person in front of the product shelving unit 22 based on the person detecting unit 102 is completed, and executes product inference or recognition. Then, the product recognition unit 202 associates a flow line of the determined person with identification information of the inferred or recognized product.

(d3) Person determination is executed after product recognition or inference is executed.

In this configuration, the product recognition unit 202 determines a product picked up by a person in front of the product shelving unit 22, associates the determined product with date and time information, product-picked-up location, and identification information of a product, and stores, as product-picked-up record information, the resulting information in the storage apparatus 45. Then, the information processing apparatus 100 further includes a determination unit (not illustrated) that determines a person by collating date and time information of the product-picked-up record information and the product-picked-up location with date and time information of a history of location information of each person and location information. The product recognition unit 202 associates a flow line of the person determined by the determination unit with identification information of the picked-up product, generates a product list, and stores the generated product list in the storage apparatus 45. In other words, in this configuration, every time a product is picked up, only a product ID is fixed, addition to a product list is made pending, and the product list is updated retroactively at a timing of completion of person determination.

As described above, according to the present example embodiment, at the store 20, a person having entered the store 20 is identified based on face authentication by the person detecting unit 102, a flow line of the identified person is tracked, a product picked up from the product shelving unit 22 is inferred or recognized by the product recognition unit 202, the inferred or recognized product is associated with the flow line of the person, a product list is transmitted to the user terminal 30 of the person before the person leaves from the store 20, payment processing is executed by the payment processing unit 204, based on an instruction for a settlement procedure after a customer confirms a content or based on card information of a person determined by determining, based on face authentication, a person who leaves, and an electronic receipt is transmitted to the user terminal 30, based on an payment processing result, by the output unit 206. In this manner, according to the present example embodiment, product registration is automatically executed only by picking up a product from the product shelving unit 22 of the store 20, and shopping can be finished only by making automatic settlement, based on a previously-registered credit card, or an instruction issued for an payment procedure by specifying a settlement method by the user terminal 30, at a time of leaving the store 20.

According to the above-described example embodiments, "acquisition" includes at least one of a matter that a local apparatus fetches data or information stored in another apparatus or a storage medium (active acquisition) or a matter that data or information output from another apparatus is input to a local apparatus (passive acquisition). An example of active acquisition includes receiving, based on a request or an inquiry to another apparatus, a reply thereof, reading by accessing another apparatus or a storage medium, and the like. Further, an example of passive acquisition includes receiving information being delivered (or transmitted, push-notified, or the like), and the like. Further, "acquisition" may be a matter that, among pieces of received data or information, a piece of data or information is selected and acquired, or a matter that, among pieces of delivered data or information, a piece of data or information is selected and received.

While example embodiments of the present invention have been described with reference to the drawings, these example embodiments are only exemplification of the present invention, and various configurations other than the above-described configurations can also be employed.

Figure 21:
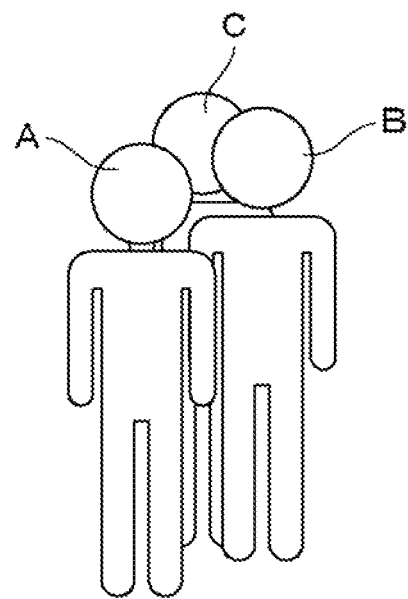
FIG. 21 is a diagram illustrating one example of an image in a situation where a plurality of persons are present in front of a product shelving unit of a store.

For example, as illustrated in FIG. 21, when, in front of the product shelving unit 22, a plurality of persons A, B, and C stand, a face of the person C being present behind the person A and the person B is hidden, and therefore there is a possibility that the face is not identified based on image recognition processing. Even in such a situation, the person detecting unit 102 indicates, based on a three-dimensional coordinate system, location information of a person and thereby can detect a location of a depth of the person, and therefore when a degree of matching has a value equal to or more than a predetermined threshold by comparing depth information of a location of a detected person (a person unable to be identified as the person C) with depth information of an estimated flow line of the person C, a determination unit 106 may determine a person whose face is unable to be authenticated as the person C.

Further, the person detecting unit 102 may determine the number of persons being present in the store 20, based on the number of visiting persons detected by the camera 5d installed in an entrance (IN) of the store 20 and the number of persons having left detected by the camera 5e installed in an exit (OUT) of the store 20. Then, the determination unit 106 may determine the number of erroneously-determined persons, based on the determined number of persons and the number of persons detected by cameras 5. In other words, when a value acquired by subtracting the number of persons having left and the number of persons detected by camaras 5 from the number of visiting persons is 0, a possibility of erroneous determination is low. On the other hand, in a case of a positive integer, a possibility that a missing person unable to be detected by the camera 5 is present is high. In a case of a negative integer, a possibility that one person is determined as a different person, based on erroneous determination, is high.

The determination unit 106 may make the determination described above and execute, when a possibility of erroneous determination is high, determination processing for whether to be the same person based on flow line information 140. Further, for example, the person detecting unit 102 may detect each of the number of persons having entered the store 20 and the number of persons having left and compute the number of persons to be currently present in the store 20, and the determination unit 106 may compare the computed number of persons with the number of users whose location information is stored in user detection information 130 and execute, by using, as a trigger, a fact that a comparison result indicates disagreement (i.e., a possibility of erroneous determination in determination of a person is high), determination processing for whether to be the same person based on flow line information 140.

At least two of the above-described example embodiments can be combined within an extent that there is no conflict.

While the invention has been particularly shown and described with reference to example embodiments and examples thereof, the invention is not limited to these example embodiments and examples. It will be understood by those of ordinary skill in the art that various changes in form and details may be made therein without departing from the scope of the present invention.

Note that, according to the present invention, when information relating to a user is acquired or used, this should be legally executed.

The whole or part of the example embodiments described above can be described as, but not limited to, the following supplementary notes.

1. An information processing apparatus including:
      a person detecting unit that executes processing of detecting a person and a location with respect to each of a first image generated in a first camera and a second image generated in a second camera;
      a coordinate generating unit that generates coordinates of the location of the detected person; and
      a determination unit that determines, by using a first location generated from the first image and a second location generated from the second image, whether the person detected from the first image and the person detected from the second image are the same person.

2. The information processing apparatus according to supplementary note 1, wherein
the determination unit determines whether the persons are the same, by using a movement vector of the person generated by using a plurality of the first images, a time from a time when the person is not detected in the first image to a time when a new person is detected in the second image, and a location of the new person.

3. The information processing apparatus according to supplementary note 1 or 2, further including
a flow-line estimation unit that estimates a flow line of the person by using a movement vector of the person generated by using a plurality of images generated in at least either of the first camera and the second camera, wherein the determination unit determines, by using the flow line of the person estimated by the flow-line estimation unit, whether a person detected as a different person is the same.

4. The information processing apparatus according to any one of supplementary notes 1 to 3, further including
a storage processing unit that stores location information of the person detected by the person detecting unit in a storage unit by person, wherein
the storage processing unit integrates, when, while being stored as a plurality of persons different from each other in the storage unit, the plurality of persons are determined as being the same person in the determination unit, pieces of location information of the plurality of persons into location information of one person.

5. The information processing apparatus according to any one of supplementary notes 1 to 4, further including:
a flow-line estimation unit that estimates a flow line of the person by using a movement vector of the person generated by using a plurality of the first images;
a product recognition unit that infers or recognizes a product picked up by the person from a product shelf, associates the inferred or recognized product with the flow line of the person, generates a product list, and stores the generated product list in a storage unit;
an payment processing unit that executes, based on the product list, payment processing for the person; and
an output unit that outputs an electronic receipt based on the payment processing.

6. The information processing apparatus according to any one of supplementary notes 1 to further including
a storage processing unit that stores location information of the person detected by the person detection unit in a storage unit by person, wherein
the person detection unit computes, from the number of persons having entered a target region for person tracking and the number of persons having left, the number of persons to be present in the target region, and
the determination unit executes processing of comparing the computed number of persons with the number of persons whose location information is stored in the storage unit and determining whether the person is the same by using, as a trigger, a fact that a comparison result indicates disagreement.

7. An information processing method executed by an information processing apparatus, the method including:
executing processing of detecting a person and a location with respect to each of a first image generated in a first camera and a second image generated in a second camera;
generating coordinates of the location of the detected person; and
determining, by using a first location generated from the first image and a second location generated from the second image, whether the person detected from the first image and the person detected from the second image are the same person.

8. The information processing method executed by the information processing apparatus according to supplementary note 7, the method further including, determining whether the persons are a same, by using a movement vector of the person generated by using a plurality of the first images, a time from a time when the person is not detected in the first image to a time when a new person is detected in the second image, and a location of the new person.

9. The information processing method executed by the information processing apparatus according to supplementary note 7 or 8, the method further including:
estimating a flow line of the person by using a movement vector of the person generated by using a plurality of images generated in at least either of the first camera and the second camera; and
determining, by using the estimated flow line of the person, whether a person detected as a different person is the same.

10. The information processing method executed by the information processing apparatus according to any one of supplementary notes 7 to 9, the method further including:
storing location information of the detected person in a storage apparatus by person; and
integrating, when, while being stored as a plurality of persons different from each other in the storage apparatus, the plurality of persons are determined as being the same person in the determination, pieces of location information of the plurality of persons into location information of one person.

11. The information processing method executed by the information processing apparatus according to any one of supplementary notes 7 to 10, the method further including:
estimating a flow line of the person by using a movement vector of the person generated by using a plurality of the first images;
inferring or recognizing a product picked up by the person from a product shelf, associating the inferred or recognized product with the flow line of the person, generating a product list, and storing the generated product list in a storage apparatus;
executing, based on the product list, payment processing for the person; and
outputting an electronic receipt based on the payment processing.

12. The information processing method executed by the information processing apparatus according to any one of supplementary notes 7 to 11, the method further including:
storing location information of the detected person in a storage apparatus by person;
computing, from the number of persons having entered a target region for person tracking and the number of persons having left, the number of persons to be present in the target region; and
executing processing of comparing the computed number of persons with the number of persons whose location information is stored in the storage apparatus and determining whether the person is the same by using, as a trigger, a fact that a comparison result indicates disagreement.

13. A program for causing a computer to execute:
 a procedure of executing processing of detecting a person and a location with respect to each of a first image generated in a first camera and a second image generated in a second camera;
 a procedure of generating coordinates of the location of the detected person; and
 a procedure of determining, by using a first location generated from the first image and a second location generated from the second image, whether the person detected from the first image and the person detected from the second image are the same person.

14. The program according to supplementary note 13, for causing a computer to further execute
 a procedure of determining whether the persons are the same, by using a movement vector of the person generated by using a plurality of the first images, a time from a time when the person is not detected in the first image to a time when a new person is detected in the second image, and a location of the new person.

15. The program according to supplementary note 13 or 14, for causing a computer to further execute:
 a procedure of estimating a flow line of the person by using a movement vector of the person generated by using a plurality of images generated in at least either of the first camera and the second camera; and
 a procedure of determining, by using the estimated flow line of the person, whether a person detected as a different person is the same.

16. The program according to any one of supplementary notes 13 to 15, for causing a computer to further execute:
 a procedure of storing location information of the detected person in a storage apparatus by person; and
 a procedure of integrating, when, while being stored as a plurality of persons different from each other in the storage apparatus, the plurality of persons are determined as being the same person in the procedure of the determination, pieces of location information of the plurality of persons into location information of one person.

17. The program according to any one of supplementary notes 13 to 16, for causing a computer to further execute:
 a procedure of estimating a flow line of the person by using a movement vector of the person generated by using a plurality of the first images;
 a procedure of inferring or recognizing a product picked up by the person from a product shelf, associating the inferred or recognized product with the flow line of the person, generating a product list, and storing the generated product list in a storage apparatus;
 a procedure of executing, based on the product list, payment processing for the person; and
 a procedure of outputting an electronic receipt based on the payment processing.

18. The program according to any one of supplementary notes 13 to 17, for causing a computer to further execute:
 a procedure of storing location information of the detected person in a storage apparatus by person;
 a procedure of computing, from the number of persons having entered a target region for person tracking and the number of persons having left, the number of persons to be present in the target region; and
 a procedure of executing processing of comparing the computed number of persons with the number of persons whose location information is stored in the storage apparatus and determining whether the person is the same by using, as a trigger, a fact that a comparison result indicates disagreement.

This application is based upon and claims the benefit of priority from Japanese patent application No. 2019-039015, filed on Mar. 4, 2019, the disclosure of which is incorporated herein in its entirety by reference.

The invention claimed is:

1. An information processing apparatus comprising:
 at least one memory storing instructions; and
 at least one processor configured to execute the instructions to:
  detect a person and a location of the detected person with respect to each of a first image generated in a first camera and a second image generated in a second camera;
  compute a degree of matching between a first location of a first person detected from the first image and a second location of a second person detected from the second image, the first image and the second image being captured at the same time;
  determine, when the degree of matching is more than a predetermined value, that the first person and the second person are the same person;
  collate feature information extracted from a face region of each of the first and second persons with a plurality of pieces of registered feature information respectively associated with a plurality of pieces of identification information, to identify identification information of each of the first and second persons; and
  in case where the degree of matching computed is not more than the predetermined value, and the identification information of the first person and the identification information of the second person are the same, determine that the first person and the second person are the same person.

2. The information processing apparatus according to claim 1, wherein the at least one processor is further configured to execute the instructions to:
 estimate the location of the detected person at a reference time from the first location of the first person detected from the first image; and
 compute a degree of matching between the location estimated from the first image and the second location of the second person detected from the second image, the second image being captured at the reference time.

3. The information processing apparatus according to claim 1, wherein the at least one processor is further configured to execute the instructions to:
 store, for each of a plurality of persons, location information of the each person detected for the each person; and
 when the plurality of persons are determined as being the same person, integrate pieces of the location information of the plurality of persons being stored as information of a plurality of different persons into location information of one person.

4. The information processing apparatus according to claim 1, wherein the at least one processor is further configured to execute the instructions to:
 estimate a flow line of the person using a plurality of images generated by at least one camera of a plurality of cameras including the first and second cameras installed in the store;
 recognize a product picked up by the person from a product shelf;
 generate a product list indicating the recognized product, associate the product list with the estimated flow line of the person; and execute, based on the product list, payment processing for the person.

5. The information processing apparatus according to claim 1, wherein the at least one processor is further configured to execute the instructions to:

store, for each of a plurality of persons, a detected location of the each person;

compute, from a number of the plurality of persons that have entered a target region and a number of the plurality of persons that have left the target region, a number of the plurality of persons that are present in the target region;

compare the number of the plurality of persons that are present in the target region and a number of the plurality of persons for which the detected location has been stored;

initiate, when the number of the plurality of persons that are present in the target region is not equal to the number of the plurality of persons for which the detection location has been stored, determination of whether the first person detected from the first image and the second person detected from the second image are the same person.

6. The information processing apparatus according to claim 1, wherein the first camera and the second camera have image-capture ranges in a target region, and the image-capture range of the first camera is at least partially different from the image-capture range of the second camera.

7. The information processing apparatus according to claim 1, wherein the at least one processor is further configured to execute the instructions to:

store tentative identification information of a person for whom the identification information is not identified in association with the feature information extracted from the face region of the person in a storage.

8. An information processing method performed by at least one computer and comprising:

detecting a person and a location of the detected person with respect to each of a first image generated in a first camera and a second image generated in a second camera;

computing a degree of matching between a first location of a first person detected from the first image and a second location of a second person detected from the second image, the first image and the second image being captured at the same time;

determining, when the degree of matching is more than a predetermined value, that the first person and the second person are the same person;

collating feature information extracted from a face region of each of the first and second persons with a plurality of pieces of registered feature information respectively associated with a plurality of pieces of identification information, to identify identification information of each of the first and second persons; and in case where the degree of matching computed is not more than the predetermined value, and the identification information of the first person and the identification information of the second person are the same, determining that the first person and the second person are the same person.

9. A non-transitory computer-readable storage medium storing a program executable by a computer to perform processing comprising:

detecting a person and a location of the detected person with respect to each of a first image generated in a first camera and a second image generated in a second camera;

computing a degree of matching between a first location of a first person detected from the first image and a second location of a second person detected from the second image, the first image and the second image being captured at the same time;

determining, when the degree of matching is more than a predetermined value, that the first person and the second person are the same person;

collating feature information extracted from a face region of each of the first and second persons with a plurality of pieces of registered feature information respectively associated with a plurality of pieces of identification information, to identify identification information of each of the first and second persons; and in case where the degree of matching computed is not more than the predetermined value, and the identification information of the first person and the identification information of the second person are the same, determining that the first person and the second person are the same person.

* * * * *